United States Patent
Pazzi et al.

(10) Patent No.: US 12,277,825 B2
(45) Date of Patent: Apr. 15, 2025

(54) SMART HOME SHORT-TERM RENTAL SYSTEM

(71) Applicant: Airbnb, Inc., San Francisco, CA (US)

(72) Inventors: James Nicholas Pazzi, San Francisco, CA (US); David Harry Garcia, Campbell, CA (US); Kyle Wulff, San Francisco, CA (US); Jason F. Harrison, San Francisco, CA (US); Amjad Obeidat, San Francisco, CA (US); Andrey Yazev, Barcelona (ES); William Anthony Burrus, Los Angeles, CA (US); Yat Choi, New York, NY (US); Guilherme Moreira Talarico, Alameda, CA (US); Taha Kowsari, San Jose, CA (US); Yipeng Cao, San Jose, CA (US); Matt Lee, Campbell, CA (US); Tyler Sax, Nashville, TN (US); Fuxin Yu, Irvine, CA (US); Roshan Umesh Goli, Castro Valley, CA (US); Xi Yang, Oakland, CA (US); Matthew Siyu Mang, Seattle, WA (US); Karina Sirqueira Silva, Brooklyn, NY (US)

(73) Assignee: Airbnb, Inc., San Francisco, CA (US)

(*) Notice: Subject to any disclaimer, the term of this patent is extended or adjusted under 35 U.S.C. 154(b) by 101 days.

(21) Appl. No.: 18/134,820

(22) Filed: Apr. 14, 2023

(65) Prior Publication Data

US 2023/0334929 A1 Oct. 19, 2023

Related U.S. Application Data

(60) Provisional application No. 63/330,966, filed on Apr. 14, 2022.

(51) Int. Cl.
*G07C 9/38* (2020.01)
*G06Q 10/02* (2012.01)
(Continued)

(52) U.S. Cl.
CPC ............... *G07C 9/38* (2020.01); *G06Q 10/02* (2013.01); *G06Q 30/0625* (2013.01);
(Continued)

(58) Field of Classification Search
CPC ..... G06Q 10/02; G06Q 50/12; G07C 9/00904
See application file for complete search history.

(56) References Cited

U.S. PATENT DOCUMENTS

2001/0034623 A1* 10/2001 Chung ................... G07F 7/025
705/5
2003/0149576 A1* 8/2003 Sunyich ................. G06Q 10/02
705/5
(Continued)

FOREIGN PATENT DOCUMENTS

CN 107221059 A * 9/2017
CN 109272617 A * 1/2019 ......... G07C 9/00174
(Continued)

OTHER PUBLICATIONS

Cabin Works, "Vacation Rental Turnovers" Jun. 29, 2017 https://web.archive.org/web/20170629011720/https://cabinworkscolorado.com/vacation-rental-cleaning/ (Year: 2017).*

(Continued)

*Primary Examiner* — Jeff Zimmerman
*Assistant Examiner* — Matthew Parker Goodman
(74) *Attorney, Agent, or Firm* — Schwegman Lundberg & Woessner, P.A.

(57) ABSTRACT

Systems and methods are provided to generate an access code specific to a user of an online marketplace to use to enter a first accommodation during a first reservation time
(Continued)

US 12,277,825 B2

Page 2 frame and a second accommodation during a second reservation time frame and to send the access code specific to the user to a computing device at the first accommodation and a computing device at the second accommodation to use to enter the first accommodation during the first reservation time period and the second accommodation during the second reservation time period. The access code is automatically removed from the computing device at the first accommodation and the computing device at the second accommodation at the end of the first reservation time period and at the end of the second reservation time period, respectively.

20 Claims, 17 Drawing Sheets

(51) Int. Cl.
G06Q 30/0601 (2023.01)
G06Q 30/0645 (2023.01)
G06Q 50/12 (2012.01)
G07C 9/20 (2020.01)
G07C 9/27 (2020.01)
H04L 12/28 (2006.01)

(52) U.S. Cl.
CPC ..... *G06Q 30/0641* (2013.01); *G06Q 30/0645* (2013.01); *G06Q 50/12* (2013.01); *G07C 9/215* (2020.01); *G07C 9/27* (2020.01); *H04L 12/2803* (2013.01); *G07C 2209/08* (2013.01)

(56) References Cited

U.S. PATENT DOCUMENTS

| | | | | |
|---|---|---|---|---|
| 2005/0264397 A1* | 12/2005 | Coelho | ............... | H04L 63/0846 340/5.28 |
| 2007/0176739 A1* | 8/2007 | Raheman | ........... | G07C 9/00904 713/176 |
| 2013/0024222 A1* | 1/2013 | Dunn | ................ | G07C 9/00904 705/5 |
| 2013/0059603 A1* | 3/2013 | Guenec | .............. | G07C 9/00571 455/456.2 |
| 2013/0088320 A1* | 4/2013 | Black | .................... | G06Q 10/06 340/286.08 |
| 2013/0305320 A1* | 11/2013 | Warrick | ................ | G06F 16/955 726/4 |
| 2015/0178716 A1* | 6/2015 | Salonen | ................ | H04W 12/06 705/44 |
| 2015/0310685 A1* | 10/2015 | Bliding | .................... | G07C 9/21 340/5.61 |
| 2018/0276928 A1* | 9/2018 | Smeets | .................. | G06Q 10/02 |
| 2019/0385392 A1* | 12/2019 | Cho | ................... | G07C 9/00309 |
| 2021/0329447 A1* | 10/2021 | Varghese | ................ | H04W 4/14 |
| 2021/0407023 A1* | 12/2021 | Brophy | .................... | G07C 9/27 |

FOREIGN PATENT DOCUMENTS

| | | | | | |
|---|---|---|---|---|---|
| CN | 110347076 | A | * | 10/2019 | |
| CN | 110599642 | A | * | 12/2019 | ......... E05B 47/0012 |
| CN | 110751755 | A | * | 2/2020 | ......... G07C 9/00309 |
| CN | 114155636 | A | * | 3/2022 | ......... G07C 9/00174 |
| KR | 2018095404 | A | * | 8/2018 | ............ G06Q 10/02 |
| KR | 2021033154 | A | * | 3/2021 | |
| WO | 2012116400 | | | 9/2012 | |
| WO | WO-2016107088 | A1 | * | 7/2016 | ............ G06Q 50/12 |
| WO | WO-2023201028 | A1 | | 10/2023 | |

OTHER PUBLICATIONS

"International Application Serial No. PCT US2023 018630, International Search Report mailed Jul. 17, 2023", 3 pgs.
"International Application Serial No. PCT US2023 018630, Written Opinion mailed Jul. 17, 2023", 5 pgs.
"International Application Serial No. PCT/US2023/018630, International Preliminary Report on Patentability malled Oct. 24, 2024", 7 pgs.

* cited by examiner

SMART HOME SHORT-TERM RENTAL SYSTEM

PRIORITY

This application claims the benefit of priority to U.S. Provisional Patent Application Ser. No. 63/330,966, filed Apr. 14, 2022, which is incorporated by reference herein in its entirety.

BACKGROUND

An online marketplace may provide a number of services, such as accommodations, tours, transportation and the like, and allow users to reserve or "book" one or more services. For example, a first user (e.g., host) can list one or more services on the online marketplace and a second user (e.g., guest) can request to view listings of services for a particular location (e.g., San Francisco) that may include a listing for the first user's service. Once the guest books a service, such as an accommodation, the host provides entry instructions for accessing the accommodation.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
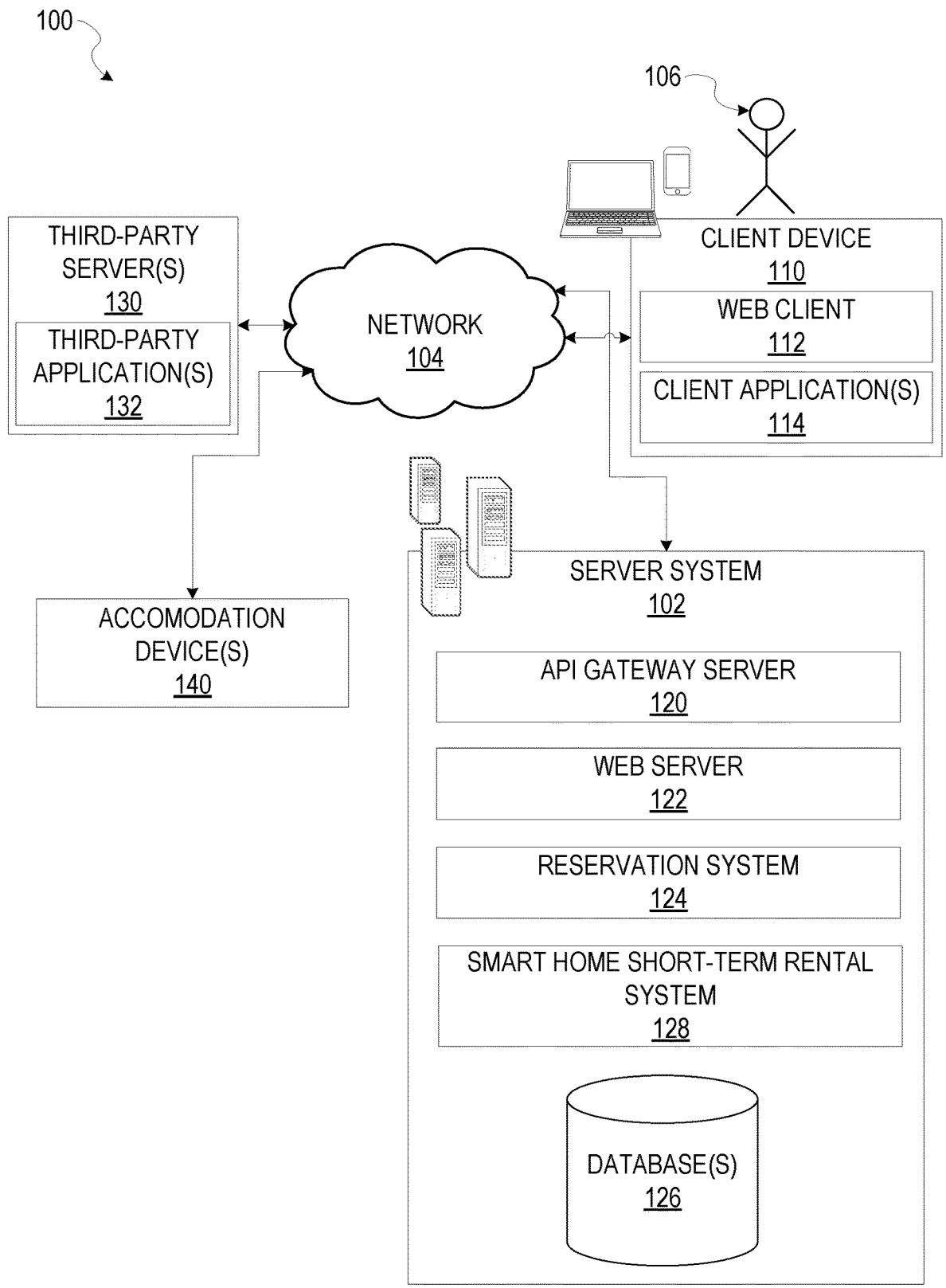
FIG. 1 is a block diagram illustrating a networked system, according to some embodiments.

Systems and methods described herein relate to a smart home short-term rental system. Many accommodations have smart home devices (e.g., smart locks, thermostats, lighting, speakers, entertainment streaming devices), and hosts lack the ability to safely or easily share those devices' capabilities with others when offering their home as an accommodation in an online marketplace. For example, most widely adopted smart home devices are designed for personal use, where usage is afforded perpetually and limited to a small, fixed set of users, and the command and control interfaces provided by these devices typically do not support the easy the usage to users outside of that small, fixed group. At the same time, short term rental hosts in an online marketplace need to provide the capabilities of some or all of their home's smart devices to a large number of frequently changing and possibly overlapping guest, host, service staff, and customer support users.

Short term rental hosts' options for enabling guests to use their smart home devices are limited. Some may individually configure their smart home devices before and after each trip, such as rotating an entry code for a smart lock or logging previous guests out of the streaming services available on their smart TV, in order to prepare these devices for use by their guests, but this is time consuming and error prone. Others may try to save time by relying on never-changing entry codes or leaving their own streaming accounts logged in for guests to use, but this creates safety and privacy risks for all involved parties.

The problem is compounded by the proliferation of different smart home device brands and smart home ecosystems. As smart home device adoption accelerates, it will become progressively harder for short term rental hosts to provide appropriately scoped use of their homes and properties. Hosts will be forced to make increasingly difficult tradeoffs between their own time, their guests' experience, and all parties' safety and privacy.

In traditional hospitality options, such as hotels, where devices such as thermostats or TVs are used, the solutions to affording usage to a large and changing population of users are straightforward. Traditional hospitality providers typically operate inventory that is physically consolidated, and typically employ on-site support in order to facilitate guest device usage. Conversely, a short-term rental platform manages reservations across a physically distributed inventory which contain a highly variable set of devices originally designed for personal use, and thus, require a different approach. Traditional hospitality options also typically have staff on-site to assist with any check in or entry or device related issues, which is not a practical model for an online marketplace comprising a short-term rental platform with accommodations hosted by millions of individual hosts across the world.

Using check-in and entry as a specific example in a short-term rental platform, once a user books an accommodation, a host of the accommodation needs to provide, among other things, entry instructions for accessing the accommodation. Hosts of accommodations and services in an online marketplace rely on a wide variety of approaches to enable users (e.g., guests or service providers, such as cleaning personnel and maintenance personnel) to enter the accommodation. These approaches are time consuming and risk-prone for hosts and present an unpredictable and unreliable entry experience for guests.

One existing approach to enable users to enter an accommodation is a key transfer. With this approach, a host meets with a guest in person to hand over a physical set of keys. This approach is not only time consuming but is often impractical since a host may not be located near the accommodation or a guest may wish to check in at odd hours. Another approach is to save time by relying on a "self-serve" approach, such as securing a set of keys in a lock box. This approach involves setting a static unlock code that can be reused later or shared with unwanted visitors. In general, transferring keys between parties carries the risk that keys will be lost, stolen, or improperly used.

Another approach is for a host to use a smart lock, smart keypad, and/or a connected smart phone application. These solutions vary widely in quality and reliability and offer limited ability to safely share temporary access to guests or service providers. Host intervention is typically needed to configure and share an entry code for each visitor. Hosts dealing with a large number of frequently changing and possibly overlapping reservations or service appointments may be tempted to leverage a single static entry code, opening their property up to unwanted use. Moreover, these solutions typically do not provide any additional measures of privacy for guests, such as limiting non-guest property access during their trip. These solutions are further vulnerable to network disruptions and power outages, during which guests may be denied entry if there is no alternative available. Moreover, because a wide variety of devices, ecosystems, and solutions have been adopted across the supply of accommodations in the online marketplace, guests are typically presented with a new interaction model to learn for each property they visit. Support staff for the online marketplace are limited in the help they can provide to guests experiencing difficulty entering a property they have booked.

Embodiments described herein address these and other technical issues with conventional systems by establishing a smart home short-term rental system to allow guests to safely and easily use smart home devices, including providing a consistent and secure entry experience, across accommodations in an online marketplace, no matter the environment, geography, or property layout. The smart home short-term rental system comprises cloud services, as well as an optional dedicated smart hub, that grant guest permissions, apply guest preferences, and/or transmit guest credentials to the applicable smart devices of an accommodation in an online marketplace.

Further, the smart home short-term rental system allows for preferences for the user to be provided to accommodation devices (e.g., entry access device, smart hub, thermostat, entertainment streaming device) in the accommodation during the user's stay so that the devices can be configured for the user preferences and are accessible and controllable by the user during their stay in the accommodation. The user can just set preferences once (or change and update preferences in one place) and then those preferences are used for any accommodation reserved by the user.

In one example, there are several features in provisioning the smart home short-term rental system to accommodate entry and access to the accommodation and accommodations devices within the accommodation. The smart home short-term rental system defines a model to issue access codes specific to each user that can be used across different accommodations by automatic provisioning of granular time-bound entry permissions to some or all of a property for each reservation. The smart home short-term rental system also enables and controls access codes for specific accommodations for hosts, service staff (e.g., cleaning personnel, maintenance personnel, gardeners), and control for customer support agents and services. These features allow the smart home short-term rental system to seamlessly transmit different attributes (e.g., preferences) for different users with different expectations and needs, to each accommodation that is reserved by each user. In this way, the smart home short-term rental system orchestrates home sharing use cases with different enforcement policies in a time-bound nature.

One feature is to generate user preferences for a stay in any accommodations. These preferences can be set by a user (or changed/updated) at any time within the online marketplace. For example, the smart home short-term rental system of an online marketplace provides a user interface for a user to input preferences for an access code, temperature, entertainment (e.g., Netflix account), and other preferences, as explained in further detail below. The smart home short-term rental system receives the user preferences and stores them in one or more datastores. The smart home short-term rental system can then transmit the user preferences to accommodation devices at the accommodation for the reservation time period, as also described in further detail below. The user preferences, such as an access code for entry to the accommodation, can coexist with access codes for others, such as hosts, cleaning personnel and so forth.

Another feature for enabling guest usage of accommodation devices within the accommodation, is credential sharing. With this feature, the smart home short-term rental system determines credentials needed for particular services and accommodation devices and provides an authentication handshake for particular services based on the user preferences, such as configuring a user's Netflix account for use during the user's stay at the accommodation. This is a time-bound access that is granted to the user during the reservation time period and is revoked at the end of the time period.

Another feature for provisioning the smart home short-term rental system to accommodate entry and access to the accommodation and accommodations devices within the accommodation, is permissions. With this feature the smart home short-term rental system sets user permissions during the user's stay at the accommodation and allows the user to have permission to perform actions with smart devices (e.g., entertainment streaming devices, temperature, lighting), during the user's stay at the accommodation. In this way a user can directly interact with a smart home device and its data (e.g., to turn a smart lightbulb on and off). This is also a time-bound access that is granted to the user during the reservation time period.

In one example, a computing system receives, from a first computing device associated with a user, a request to reserve a first accommodation for a first reservation time period, generates an access code specific to the user to use to enter an accommodation during a reservation time period, and sends, to the first computing device, a confirmation of a reservation for the accommodation for the first reservation time period and the access code specific to the user to use to enter the first accommodation during the first reservation time period. The computing system sends the access code specific to the user to a second computing device located at the first accommodation at a predetermined time before a start of the first reservation time period to allow access to the first accommodation during the first reservation time period, wherein the access code is automatically removed from the second computing device at the first accommodation at the end of the first reservation time period. The computing system further receives from the first computing device associated with the user, a request to reserve a second accommodation for a second reservation time period and sends, to the first computing device, a confirmation of the reservation for the second accommodation for the second reservation time period and the access code specific to the user to use to enter the second accommodation during the second reservation time period. The computing device sends the access code specific to the user to a third computing device located at the second accommodation at a predetermined time before a start time of the second reservation time period to allow access to the second accommodation during the second reservation time period, wherein the access code is automatically removed from the second computing device at the second accommodation at the end of the second reservation time period.

FIG. 1 is a block diagram illustrating a networked system 100, according to some example embodiments. The networked system 100 may include one or more computing devices such as a client device 110. The client device 110 may comprise, but is not limited to a mobile phone, desktop computer, laptop, portable digital assistant (PDA), smart phone, tablet, ultrabook, netbook, laptop, multiprocessor system, microprocessor-based or programmable consumer electronic system, game console, set-top box, computer in a vehicle, wearable device (e.g., smart watch, smart glasses), or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request and receive reservation information, accommodation information, entry and access information for a reserved accommodation, set or update user preferences, and so forth, associated with travel. The client device 110 may also be a device of a user that is used to post and maintain a listing for a service, request and receive reservation information and guest information, generate entry and access information (e.g., access codes), set or update user preferences, and so forth.

One or more users 106 may be a person (e.g., guest, host, service personnel, customer support agent), a machine, or other means of interacting with the client device 110. In example embodiments, the user 106 may not be part of the networked system 100 but may interact with the networked system 100 via the client device 110 or other means. For instance, the user 106 may provide input (e.g., voice input, touch screen input, alphanumeric input) to the client device 110 and the input may be communicated to other entities in the networked system 100 (e.g., third-party servers 130, a server system 102) via a network 104. In this instance, the other entities in the networked system 100, in response to receiving the input from the user 106, may communicate information to the client device 110 via the network 104 to be presented to the user 106. In this way, the user 106 may interact with the various entities in the networked system 100 using the client device 110.

The networked system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the internet, a portion of the public switched telephone network (PSTN), a cellular telephone network, a wireless network, a Wi-Fi network, a WiMAX network, another type of network, or a combination of two or more such networks.

One or more portions of the network 104 may comprise short-range wireless communication, such as Bluetooth, WiFi, near field communication (NFC), ultraband, Zigbee, or other form of short-range wireless communication.

The client device 110 may access the various data and applications provided by other entities in the networked system 100 via a web client 112 (e.g., a browser, such as the Internet Explorer® browser developed by Microsoft® Corporation of Redmond, Washington) or one or more client applications 114. The client device 110 may include one or more client applications 114 (also referred to as "apps") such as, but not limited to, a web browser, a messaging application, an electronic mail (email) application, an ecommerce site application, a mapping or location application, a reservation application, an entry or keypad access application, a customer support application, and the like.

In some embodiments, one or more client applications 114 may be included in a given one of the client devices 110 and configured to locally provide the user interface and at least some of the functionalities, with the client application 114 configured to communicate with other entities in the networked system 100 (e.g., third-party servers 130, the server system 102), on an as-needed basis, for data and/or processing capabilities not locally available (e.g., to access reservation or listing information, request data, authenticate a user 106, verify a method of payment, receive an access code). Conversely, one or more client applications 114 may not be included in the client device 110, and then the client device 110 may use its web browser to access the one or more applications hosted on other entities in the networked system 100 (e.g., third-party servers 130, the server system 102).

The networked system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102, such as entry and access information for an accommodation. The third-party servers 130 may be a cloud computing environment, according to some example embodiments. The third-party servers 130, and any servers associated with the third-party servers 130, may be associated with a cloud-based application, in one example embodiment.

The server system 102 may provide server-side functionality via the network 104 (e.g., the internet or a WAN) to one or more third-party servers 130 and/or one or more client devices 110 and/or one or more accommodation devices 140. The server system 102 is a cloud computing environment, according to some example embodiments. The server system 102, and any servers associated with the server system 102, are associated with a cloud-based application, in one example embodiment.

In one example, the server system 102 provides server-side functionality for an online marketplace. The online marketplace may provide various listings for trip items, such as accommodations hosted by various managers (also referred to as "owners" or "hosts") that can be reserved by clients (also referred to as "users" or "guests"), such as an apartment, a house, a cabin, one or more rooms in an apartment or house, and the like. As explained above, the online marketplace may further provide listings for other trip items, such as experiences (e.g., local tours), car rentals, flights, public transportation, and other transportation or activities related to travel.

The server system 102 may include the API gateway server 120, a web server 122, a reservation system 124 and a smart home short-term rental system 128 that may be communicatively coupled with one or more databases 126 or other forms of data store.

The one or more databases 126 may be one or more storage devices that store data related to the reservation system 124, the smart home short-term rental system 128, and other systems or data. The one or more databases 126 may further store information related to third-party servers 130, third-party applications 132, client devices 110, client applications 114, users 106, accommodation devices 140, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage in some embodiments.

The reservation system 124 manages resources and provides back-end support for third-party servers 130, third-party applications 132, client applications 114, and so forth, which may include cloud-based applications. The reservation system 124 provides functionality for viewing listings related to trip items (e.g., accommodation listings, activity listings), generating and posting a new listing, analyzing and ranking images to be posted in a new listing, managing listings, booking listings and other reservation functionality, and so forth, for an online marketplace. Further details related to the reservation system 124 are shown in FIG. 2.

Figure 2:
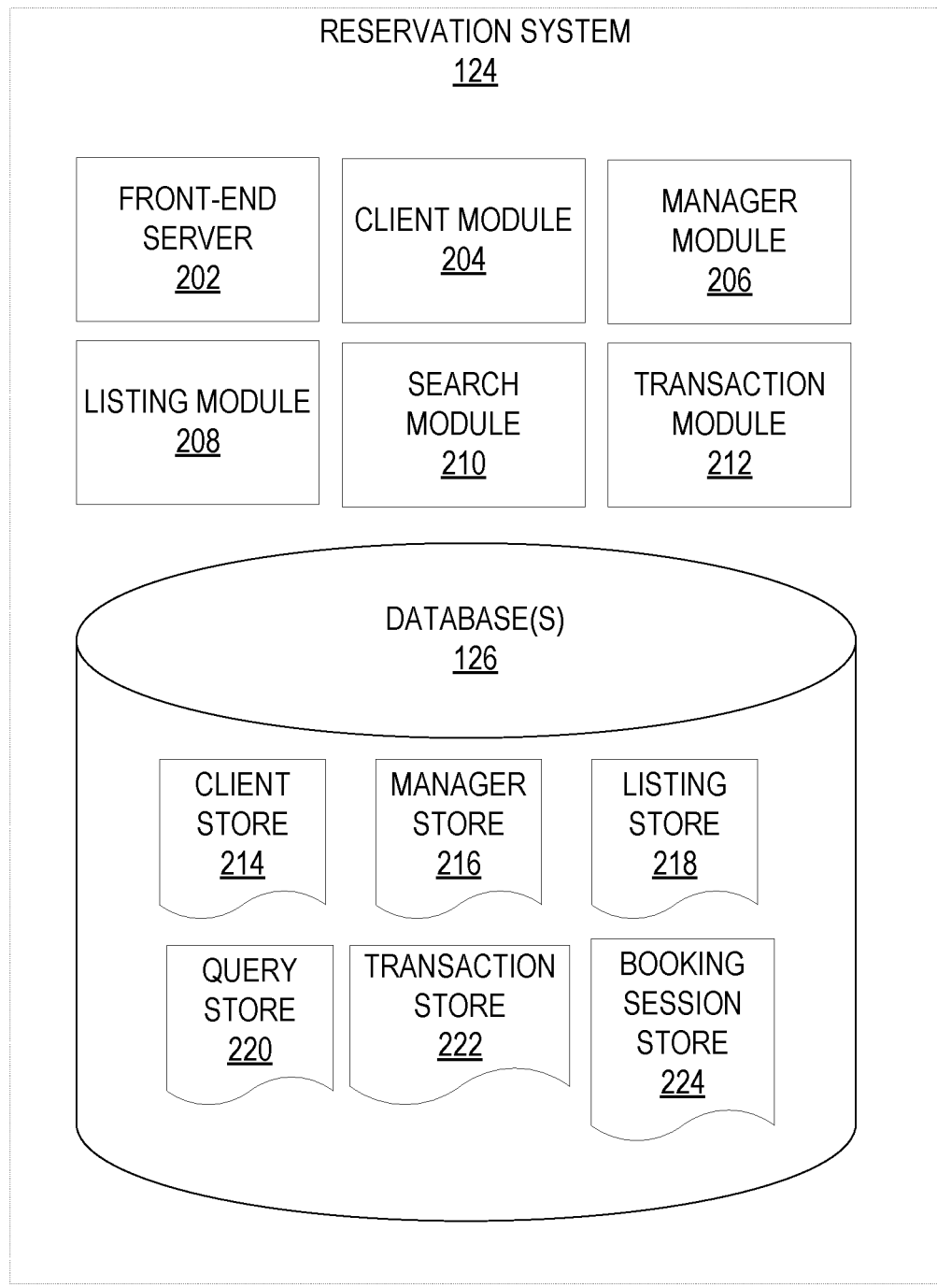
FIG. 2 is a block diagram illustrating a reservation system, according to some embodiments.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 may be implemented using a single computing device or a network of computing devices, including cloud-based computer implementations. The computing devices may be server-class computers including one or more high-performance computer processors and random access memory, which may run an operating system such as Linux or the like. The operations of the reservation system 124 may be controlled either through hardware or through computer programs installed in nontransitory computer-readable storage devices such as solid-state devices or magnetic storage devices and executed by the processors to perform the functions described herein.

The front-end server 202 includes program code that allows client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 and third-party servers 130 and applications 132 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, an access code, smart device (e.g., accommodation device 140) preferences (e.g., user preferences), and so forth. The client's geographical location is either the client's current location (e.g., based on information provided by the client device 110) or the client's manually entered home address, neighborhood, city, state, or country of residence. The client location may be used to filter search criteria for time-expiring inventory relevant to a particular client or to assign default language preferences.

The client module 204 provides code for clients to set up and modify the client profile. The reservation system 124 allows each client to exchange communications, request transactions, and perform transactions with one or more managers.

The manager module 206 comprises program code that provides a user interface that allows managers (also referred to herein as "users," "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and descriptions that characterize the inventory; and any other relevant information. For example, for an accommodation reservation system, a listing may include a type of accommodation (e.g., house, apartment, room, sleeping space, or other), a representation of its size (e.g., square footage, number of rooms), the dates that the accommodation is available, and a price (e.g., per night, per week, per month). The listing module 208 allows a user 106 to include additional information about the inventory, such as videos, photographs, and other media, or such as accessibility and other information.

The geographical location associated with the listing identifies the complete address, neighborhood, city, and/or country of the offered listing. The listing module 208 is also capable of converting one type of location information (e.g., mailing address) into another type of location information (e.g., country, state, city, neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory). Information from each listing calendar is stored in the listing store 218.

Figure 3:
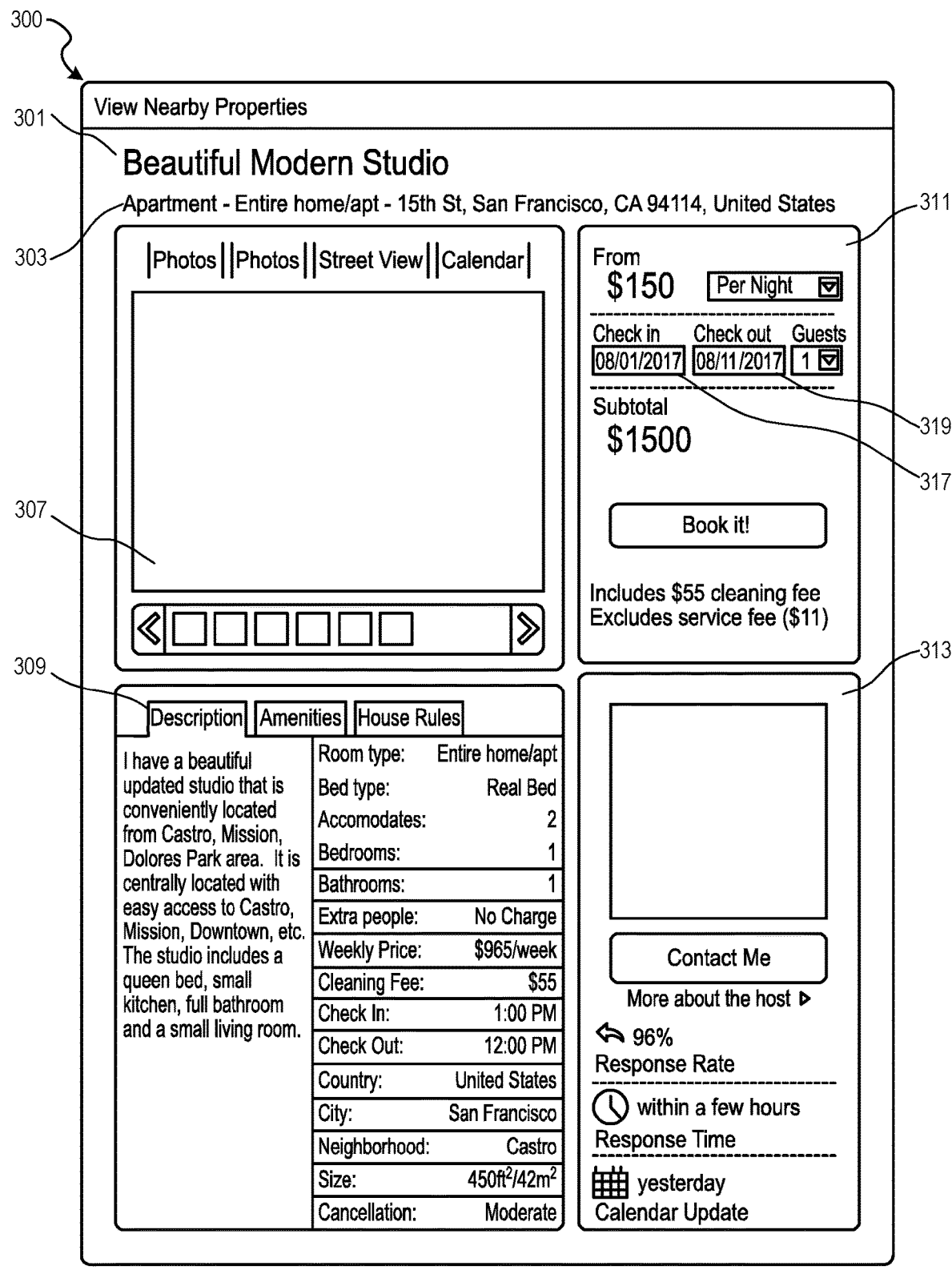
FIG. 3 illustrates an example user interface for a description of a listing for a trip item, according to some embodiments.

FIG. 3 illustrates an example user interface 300 for a description of a listing for a trip item (e.g., an apartment in San Francisco) in an online marketplace. The example listing shown in FIG. 3 is for accommodations in San Francisco. In other examples, the listing could be for a tour, local experience, transportation service, or other trip item. The listing may include a title 301 and a brief description 303 of the trip item. The listing may further include photos of the trip item, maps of the area or a location associated with the trip item, a street view of the trip item, a calendar for the trip item, and so forth, which may be viewed in area 307. The listing may include a detailed description 309, pricing information 311, and the listing host's information 313. The listing may further allow a user to select a date range for the trip item by entering or choosing specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively changing which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and, in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Returning to FIG. 1, the server system 102 further includes a smart home short-term rental system 128. The smart home short-term rental system 128 manages resources and provides back-end support for third-party servers 130, third-party applications 132, client applications 114, accommodation device(s) 140, and so forth, which may include cloud-based applications. The smart home short-term rental system 128 drives short term rental business logic for accommodations, such as granting time-bound device usage permissions to guests as determined by their reservation.

The smart home short-term rental system 128 further extends control and customization of an accommodation environment to various users including hosts, guests, and operational staff through standardized interfaces on mobile and desktop devices. The smart home short-term rental system 128 defines a sharing model that enables hosts to issue access codes to grant permission to co-hosts, guests, service staff, and customer support agents in accordance with relevant reservations, users, and listings in an online marketplace and allows users to set preferences for smart devices and services for accommodations. The access codes provide time-bound usage permission to the large and changing user population that is characteristic of short-term rental use.

Figure 4:
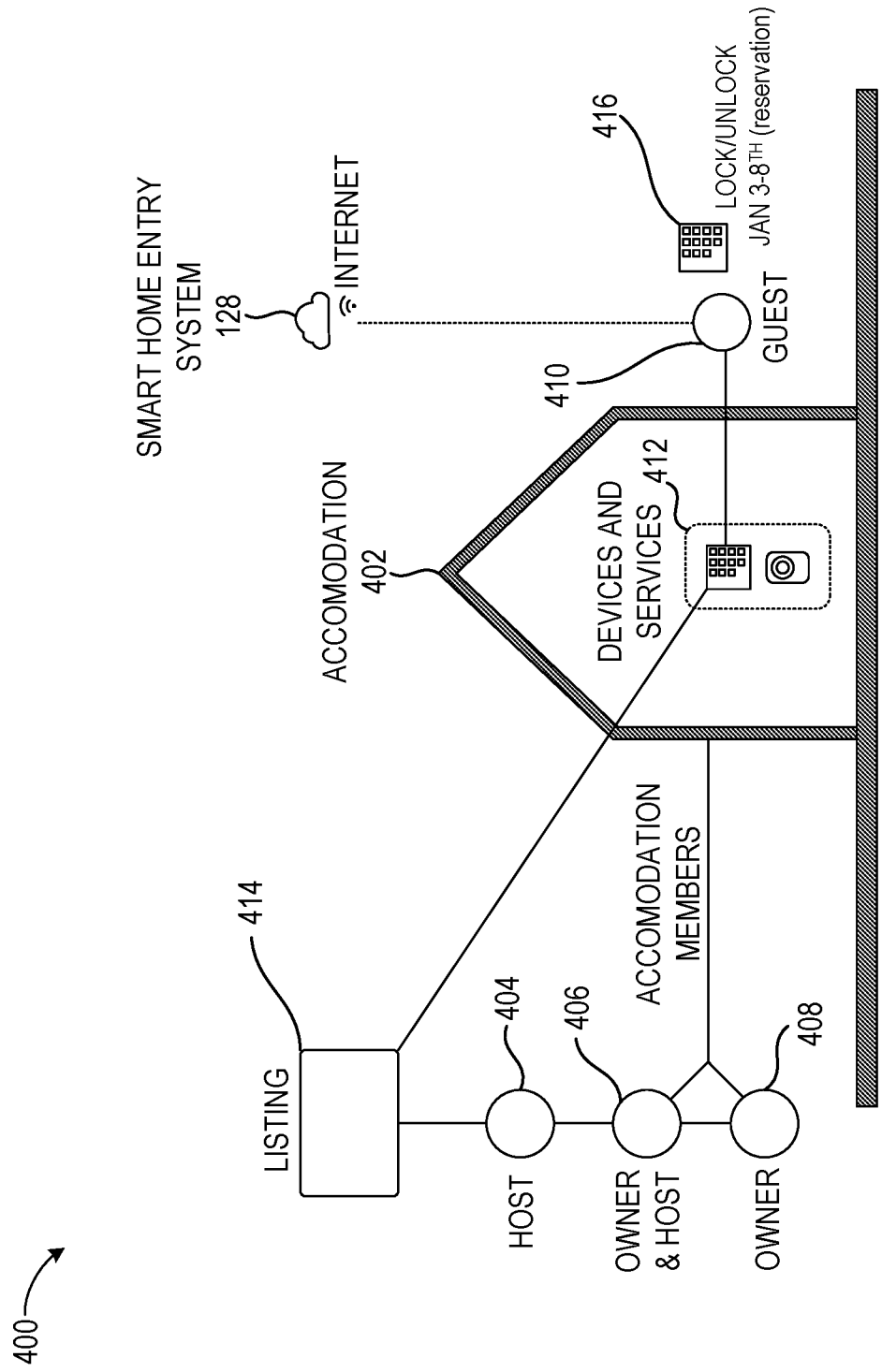
FIG. 4 is a diagram illustrating an example scenario where various users can access and interact with services and devices in an accommodation, according to some embodiments.

For example, FIG. 4 is a diagram 400 illustrating an example scenario where various users 404, 406, 408 and 410 can access and interact with services and devices 412 in an accommodation 402. For example, one or more hosts or owners 404, 406, 408 of the accommodation 402 can generate a listing 414 for the accommodation 402. A guest 410 can view the listing 414 and reserve the accommodation 402 for a specified time period (e.g., a reservation time period). Before the start of the reservation time period, the guest 410 receives an access code 416 from the smart home short-term rental system 128 to use to lock and unlock an entry access device (e.g., accommodation device 140 and one of the devices and services 412). The access code 416 is specific to the guest 410 and can be used across multiple accommodations that are reserved by the user. The host 404, owner and host 406, and owner 408 also each have an access code to lock and unlock the entry access device.

The various users 404, 406, 408, and 410 can also access the devices and services 412 to control the environment of the accommodation 402, such as temperature, lighting, entertainment, and so forth. Preferences specific to each user can be set up automatically by the smart home short-term rental system 128 before arrival of each user. For example, the smart home short-term rental system 128 sends the access code specific to the guest 410 and any user preferences to either a smart hub or individual device in the accommodation 402, as discussed further below, so that the environment can be set up to the user's preference prior to or upon arrival.

Figure 5:
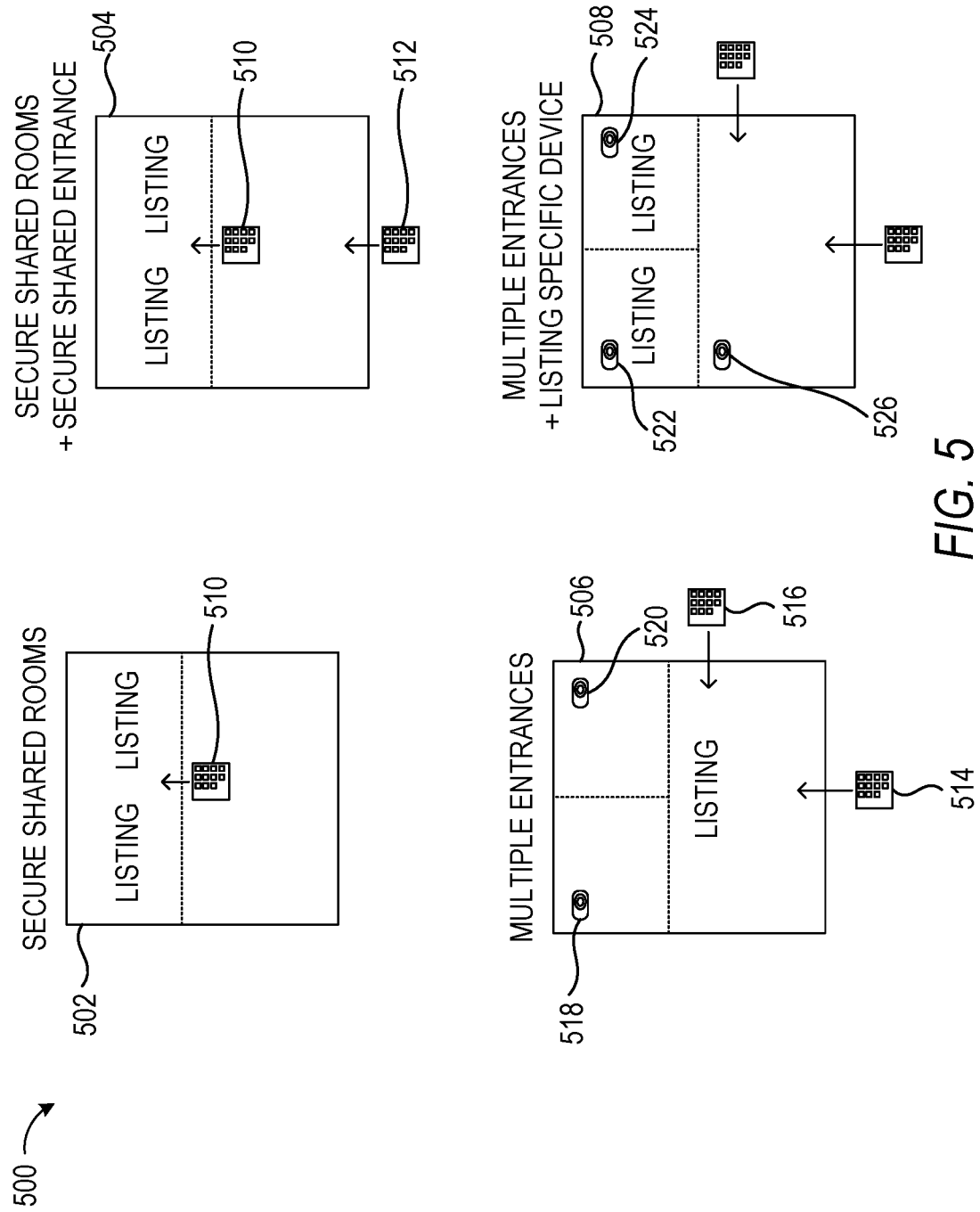
FIG. 5 is a diagram illustrating different layout scenarios for an accommodation, according to some embodiments.

The time-bound device usage permissions (e.g., in the form of an access code) can be granted to some or all of a property for each reservation, no matter the location or layout of the property. FIG. 5 is a diagram illustrating different layout scenarios for an accommodation. Secured shared rooms 502 is a scenario where there is a separate listing for each bed in a single room of the accommodation. In this scenario an access code may be given for an entry to the shared room via an entry access device (e.g., accommodation device 140). The secure shared rooms and secure shared entrance 504 is a scenario where there is also an entry access device for an entry to the accommodation (e.g., front door, gate, garage door). In this scenario, an access code may be given for an entry to the accommodation and also for the shared room. In one example, the access code is the same for both entries for each guest since it is specific to each user entering the accommodation and shared room.

Multiple entrances 506 is a scenario where there is more than one entrance secured with an entry access device 514 and 516. In this scenario an access code is given to access both entries. The multiple entrances and listing specific device 508 is a scenario where there are multiple entrances and a device 518 and device 520 (e.g., accommodation device 140 such as an entertainment device, temperature control device, or lighting) that is specific to each guest/ reservation. In the example shown as multiple entrances listing specific device 508, each room in the accommodation has a specific device 522 and 524 that can be accessed by the guest staying in that room and a device 526 that can be used by all guests. The access code specific to the guest would work to access the device specific to the guest's reservation and also the device 526 and user preferences would be set up for each user.

Returning to FIG. 1, the smart home short-term rental system 128 provides functionality for generating an access code specific to a user to enter accommodations that the user has reserved via the online marketplace or for a host or maintenance personnel (e.g., cleaning personnel) to access one or more accommodations in the online marketplace, sending the access code specific to the user and any user preferences to one or more computing devices located at the accommodation, generating and sending personal preferences (e.g., temperature settings, entertainment settings) to one or more computing devices located at the accommodation, and so forth, for an online marketplace.

Accommodation device(s) 140 are computing devices that are located at a particular accommodation (also referred to herein as a "property"). An accommodation device 140 can include a first-party device associated with the smart home short-term rental system 128 and provided by an entity that provides the smart home short-term rental system 128 or a third-party device that is provided by one or more third-parties, such as third parties associated with third-party servers 130 and third-party applications 132.

In one example the accommodation device 140 is a smart hub device that can control various individual devices within the accommodation, such a thermostat, entertainment settings of a television or device connected to a television, lighting, entry access devices (e.g., keypads/smart locks to enter the accommodations, a room of the accommodation, storage of the accommodation, a gate for the accommodation), and other devices. Some examples of existing smart hub solutions include Amazon Alexa, Google Home, and Apple HomeKit.

The smart hub device is a hardware controller that establishes network connections with the other devices to provide functions and amenities relevant to a short-term rental usage, such as an entry system, environment controls, and a smart TV. One advantage of an optional smart hub provided by an entity of the smart home short-term rental system 128 (e.g., first-party device) versus existing smart hub solutions by third-parties (e.g., third-party device) is that it can define a standard protocol interface for smart devices. Moreover, on-device processing allows local products and service to operate autonomously, with low interaction latency, high availability, and increased privacy. Further, a smart hub provides a solution space that is no longer coupled to the availability of the internet and also provides insights and learning opportunities of how guests interact with devices. Having a better understanding of guests and their preferences during a stay at an accommodation reveals opportunities for improvements for hosts and the online marketplace.

In one example, the accommodation device 140 as a smart hub uses a process to onboard and certify interested third-party companies by implementing endpoints that allow the smart hub to contact third-party servers to get updates and control their devices on behalf of users, after the user has approved such use. For example, the smart hub would use third-party provided APIs that may include a URL endpoint, API keys, and security tokens to be used to communicate with the third-party servers and the connected smart devices (e.g., other accommodation devices 140). For example, the third-party server 130 can provide protocols to accept standard requests for device discovery, device attribute queries, device capability state queries, device command execution, and so forth. In this way, the smart hub can access, control, and get device status for each smart device (accommodation device 140).

In another example, the accommodation device 140 is one of the individual devices within the accommodation, such as an access device (also referred to herein as an "entry access device") that allows entry to one or more entryways of the accommodation (e.g., gate, front door, garage door, room, closet). In one example, the access device includes a smart keypad that connects to and controls smart lock products. Some examples of smart lock solutions include August Smart Lock, Schlage Smart lock, and Kwikset Smart Lock.

The accommodation devices 140 can communicate with the server system 102 and smart home short-term rental system 128 via the network 104 or other means for communicating via wired or wireless technology. In another example, the smart home short-term rental system 128 can communicate with an accommodation device 140 via the client device 110, as explained in further detail below.

The smart home short-term rental system 128 comprises integration protocols for discovering, enabling configuration, establishing connections with, and controlling accommodation device(s) 140 either directly or via a third-party cloud (e.g., third-party servers 130). For example, the smart home short-term rental system 128 provides an interface to accommodation device(s) 140, which uses a combination of local connectivity protocols and cloud-to-cloud integrations to broker commands that customize those devices' functions per the needs of a given reservation. The interface helps extend command and control to the heterogeneous device composition that is characteristic of short-term rental use.

In one example, third parties can register APIs (e.g., API URLs) to be used by the smart home short-term rental system 128 to access, control, and get device states of one or more third-party devices 144 in one or more accommodations on behalf of a user. A host can give the smart home short-term rental system 128 access to the one or more third-party devices 144 and then the smart home short-term rental system 128 can access, control, and get device states of the one or more third-party devices 144 via the third-party API (e.g., via a third-party cloud such as third-party servers 130).

Figure 6:
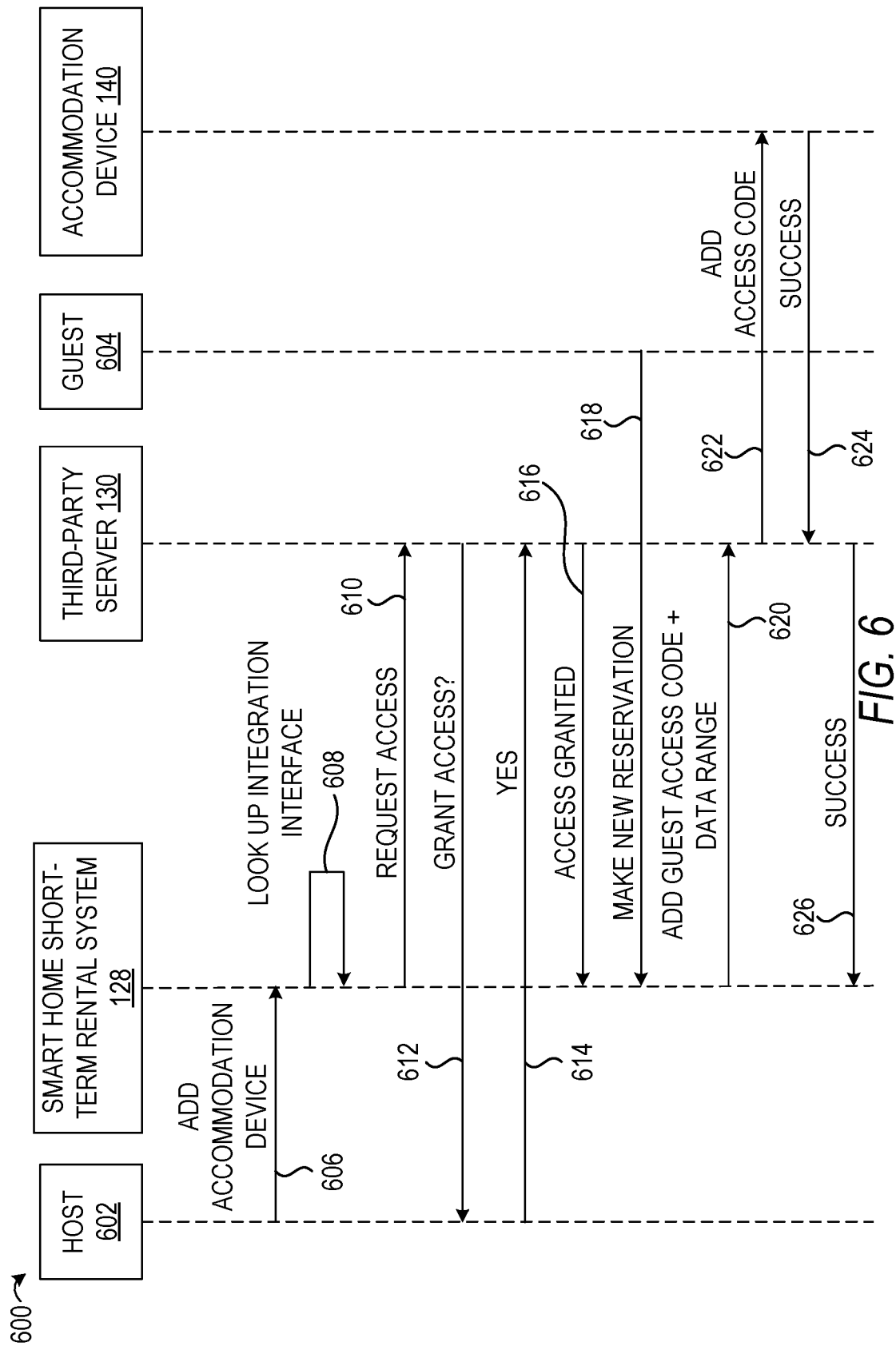
FIG. 6 illustrates an example process for a host to set up an accommodation device with the smart home short-term rental system, according to some embodiments.

FIG. 6 illustrates an example process for a host to set up an accommodation device 140 with the smart home short-term rental system 128. In one example, the accommodation device 140 is an entry access device, such as a smart lock. In operation 606, the host 602 sends a request via a computing device (e.g., via a client device 110) to the smart home short-term rental system 128 to add the accommodation device 140 to the smart home short-term rental system 128. For example, the host may have an August Smart Lock on the front door of the accommodation.

At operation 608, the smart home short-term rental system 128 looks up the integration interface (e.g., third-party API) for the accommodation device 140. In operation 610 the smart home short-term rental system 128 sends a request to the third-party server 130 associated with the accommodation device 140 via the integration interface to request access to the accommodation device 140. At operation 612 the third-party server 130 sends a request to the computing device of the host 602 to confirm that the host 602 grants access to the smart home short-term rental system 128 for the accommodation device 140. At operation 614 the host 602, via the computing device, sends the authorization to the third-party server 130 granting access to the accommodation device 140.

In one example, once the access is granted, the smart home short-term rental system 128 generates a temporary access code that the host 602 (or user setting up access) can use to test that the accommodation device 140 is set up correctly. The smart home short-term rental system 128 sends the temporary access code to a computing device of the host 602 and detects if the temporary access code was entered into the accommodation device 140 and if the accommodation device 140 was able to unlock and/or lock properly with the temporary access code. The smart home short-term rental system 128 can cause for display on the computing device of the host 602 instructions indicating how the experience of using the accommodation device 140 would look to a guest. If the smart home short-term rental system 128 detects that the accommodation device 140 was not able to unlock and/or lock properly with the temporary access code, the smart home short-term rental system 128 can cause for display on the computing device of the host 602 instructions for troubleshooting the accommodation device 140.

Once the access is granted, the smart home short-term rental system 128 can access, control, and get device status of the accommodation device 140 directly or via the third-party server 130. For example, when a guest 604 books an accommodation hosted by the host 602, in operation 618 a new reservation is made for a specified reservation time period. In operation 620, the smart home short-term rental system 128 sends the access code specific to the guest 604, and a date range corresponding to the specified reservation time period, to the third-party server 130. The date range is the time period during which the access code will be active. In operation 622, the third-party server 130 adds the access code to the accommodation device 140 prior to or at the start time of the reservation period. In operation 624, the accommodation device 140 indicates that the access code was successfully added to the third-party server 130 and in operation 626, the third-party server 130 indicates that the access code was successfully added to the smart home short-term rental system 128. The smart home short-term rental system 128 can send a message to the computing device of the guest 604 with confirmation of the reservation and the access code to use to enter the accommodation during the reservation time period.

In one example, before adding the access code to the accommodation device 140, the smart home short-term rental system 128 detects that the accommodation device 140 is offline, and thus the access code cannot be added. In this example, the smart home short-term rental system 128 instead uses for the reservation a previously defined access code for the accommodation device 140. The previously defined access code may be one of several (e.g., 3) access codes that are stored at the accommodation device 140 as "backup" codes in the event the accommodation device 140 is offline when the smart home short-term rental system 128 needs to add a new access code to the accommodation device 140. A new access code can be added at a time a new reservation is made or after the reservation is made. The smart home short-term rental system 128 can send the previously defined access code to the computing device of the guest 604 with confirmation of the reservation or within a predefined period (e.g., 48 hours) before a start date of a reservation. The smart home short-term rental system 128 can add the date range for the previously defined access code corresponding to the specified reservation time period once it detects the accommodation device 140 is back online. In one example, the smart home short-term rental system 128 deletes the previously defined access code after the end of the reservation.

Some example scenarios when a previously defined access code is used include when the accommodation device 140 is offline and never came back online, the accommodation device 140 was online but a third-party system (e.g., third-party cloud services via third-party server 130) failed to deliver the access code to the accommodation device 140, the accommodation device 140 was out of memory and a swap of an access code failed (e.g., removing a less urgent access code for an urgent access code failed), the access code made for a reservation was deleted or corrupted and was not corrected, a new access code for a guest is created that is the same as a previously defined access code, or other issues that arise that make for a scenario where an access code cannot be added to the accommodation device 140.

In one example, when an accommodation device 140 is first added to the smart home short-term rental system 128, a set of "backup" codes are sent and delivered to the accommodation device 140 as the previously defined access codes with a permanent availability window. In one example, the accommodation device 140 is not considered active until the backup codes are in place. For example, the smart home short-term rental system 128 sends the set of backup codes to the accommodation device 140, detects that the backup codes are stored on the accommodation device 140, and then activates the accommodation device 140 for use for the accommodation.

In one example, the smart home short-term rental system 128 will continue trying to update the accommodation device 140 with an access code specific to the guest 604 until it detects it is a predefined time (e.g., 48 hours) before the reservation start for the accommodation. At the predefined time, the smart home short-term rental system 128 stops trying to update the accommodation device 140 with the access code specific to the guest 604 and instead switches to a previously defined access code and provides the guest 604 with the previously defined access code to use to access the accommodation. In one example, the smart home short-term rental system 128 notifies the host 602 that the previously defined access code is being used. In the case of a guest 604 making a reservation within the predefined time before the reservation start for the accommodation, if the smart home short-term rental system 128 is not able to deliver an access code specific to the guest 604, the smart home short-term rental system 128 immediately switches to the previously defined access code.

In one example, a host 602 cannot access any previously defined access code and there is no way for a host 602 to reveal any previously defined access code unless one is activated for use by a guest 604, as explained above. The smart home short-term rental system 128 can notify the host 602, via a computing device of the host 602, that a reservation has been switched to a previously defined access code.

In one example, the smart home short-term rental system 128 generates another "backup" code to replace the previously defined access code used for the reservation and adds it to the accommodation device 140 once it detects that the accommodation device 140 is back online. In this way there is always one or more previously defined access codes stored at the accommodation device 140 for use in the event that the accommodation device 140 is offline. Thus, a guest will have a working access code to use to enter the accommodation, even if the accommodation device 140 remains offline. In one example, the one or more previously defined access codes are initially added by the smart home short-term rental system 128 when a user sets up a new accommodation device 140, as explained above.

In one example, a user (e.g., owner, host, co-host) can set a check in and check out time per reservation and a grace period when a guest access code will be active. For example, a user can set a check in time to 11:00 am and a checkout time to 3:00 pm and then a grace period of one hour before the check in time and 30 minutes after the checkout time. In this example, the smart home short-term rental system 128 sets the period when the access code for the guest is active to 10:00 am on the date of check in through 3:30 pm on the date of checkout.

Moreover, in example embodiments a user (e.g., owner, host, co-host) can change a check in or checkout time or grace period for a reservation or for all reservations. The smart home short-term rental system 128 receives the updated check in, checkout times, and/or grace period and updates the time period when the guest access code is active based on these updates.

The smart home short-term rental system 128 can receive device status (e.g., unlocked, locked, open) of the accommodation device 140 via the third-party server 130 or directly from the accommodation device 140 or smart hub. At the end of the reservation time period (date range), the access code is removed automatically from the accommodation device 140 so that the guest can no longer access the accommodation via the accommodation device 140. The access code can be automatically removed by the third-party server 130, the smart home short-term rental system 128, or the accommodation device 140 itself.

Figure 12:
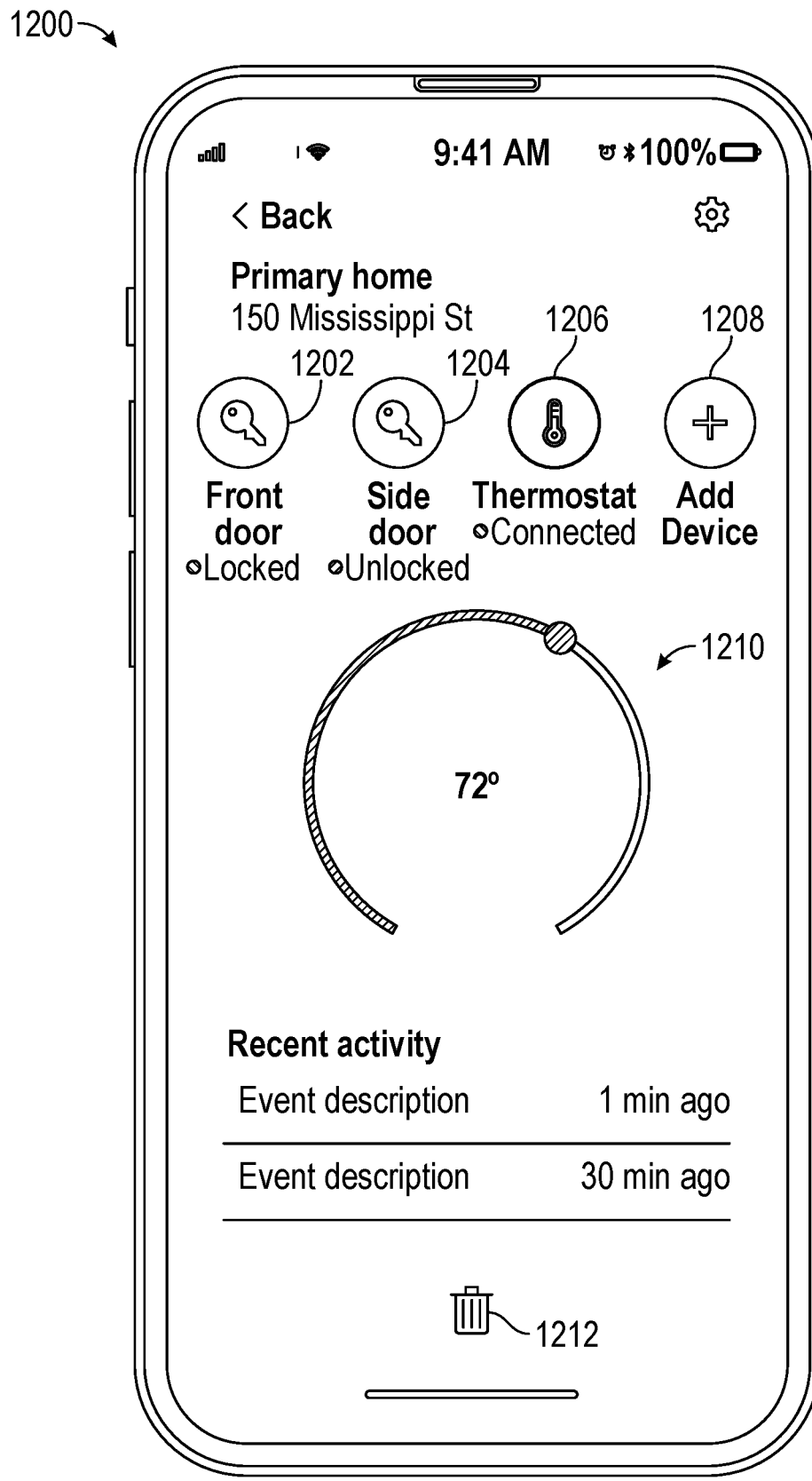
FIGS. 12-14 each illustrate an example user interface, according to some example embodiments.

FIG. 12 illustrates an example user interface 1200 that a user, such as a host or owner, may use to view accommodation devices 140 that have been added for an accommodation and add a new accommodation device 140 for the accommodation, as described above with respect to FIG. 6. The example user interface 1200 shows three accommodation devices 140 that the host 602 has added. These accommodation devices 140 include an entry access device 1202 for a front door, an entry access device 1204 for a side door, and a thermostat 1206. An access device 140 can be selected to show more details about the device.

In this example, the thermostat 1206 is selected and further detail 1210 is shown about the settings (e.g., the thermostat 1206 is set at 72 degrees) and recent events related to the activity and the timing of those events. Events can include turning the thermostat on or off, a change in one of the settings of the thermostat, and the like.

The example user interface 1200 also includes an option 1212 to delete the accommodation device 140. For example, a user can select to delete the thermostat 1206 so that it is not included in the list of accommodation devices 140 for the accommodation. The example user interface 1200 further includes an option 1208 to add an accommodation device 140, which can be added as described above with respect to FIG. 6.

Figure 13:
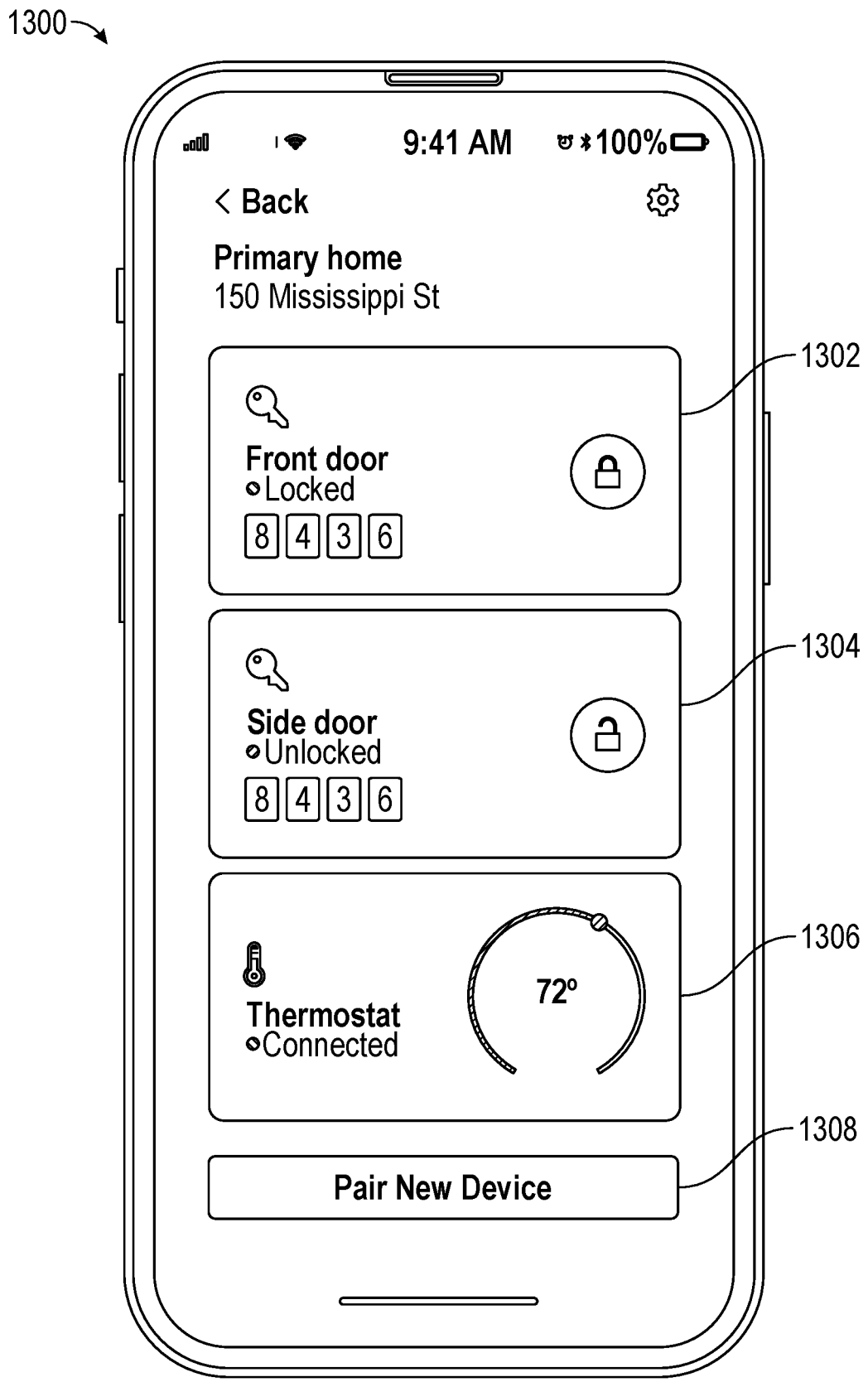

FIG. 13 illustrates another example user interface 1300 that a user, such as a host or owner, may use to view accommodation devices 140 that have been added for an accommodation and add a new accommodation device 140 for the accommodation, as described above with respect to FIG. 6. The example user interface 1300 shows three accommodation devices 140 that the host 602 has added. These accommodation devices 140 include an entry access device 1302 for a front door, an entry access device 1304 for a side door, and a thermostat 1306. For each of these devices a status and further information is shown. For example, for the entry access device 1302, the status shows that the front door is currently locked and the entry code for the front door is also shown. For the entry access device 1304, the status shows that the side door is unlocked and the entry code for the side door is shown. Further, for the thermostat 106, the status shows that it is connected and the current temperature or the current temperature setting is shown.

The example user interface 1300 can also include an option to delete the accommodation device 140 (not shown). For example, a user can select to delete the thermostat 1306 so that it is not included in the list of accommodation devices 140 for the accommodation. The example user interface 1300 further includes an option 1308 (e.g., Pair New Device) to add an accommodation device 140, which can be added as described above with respect to FIG. 6.

Figure 7:
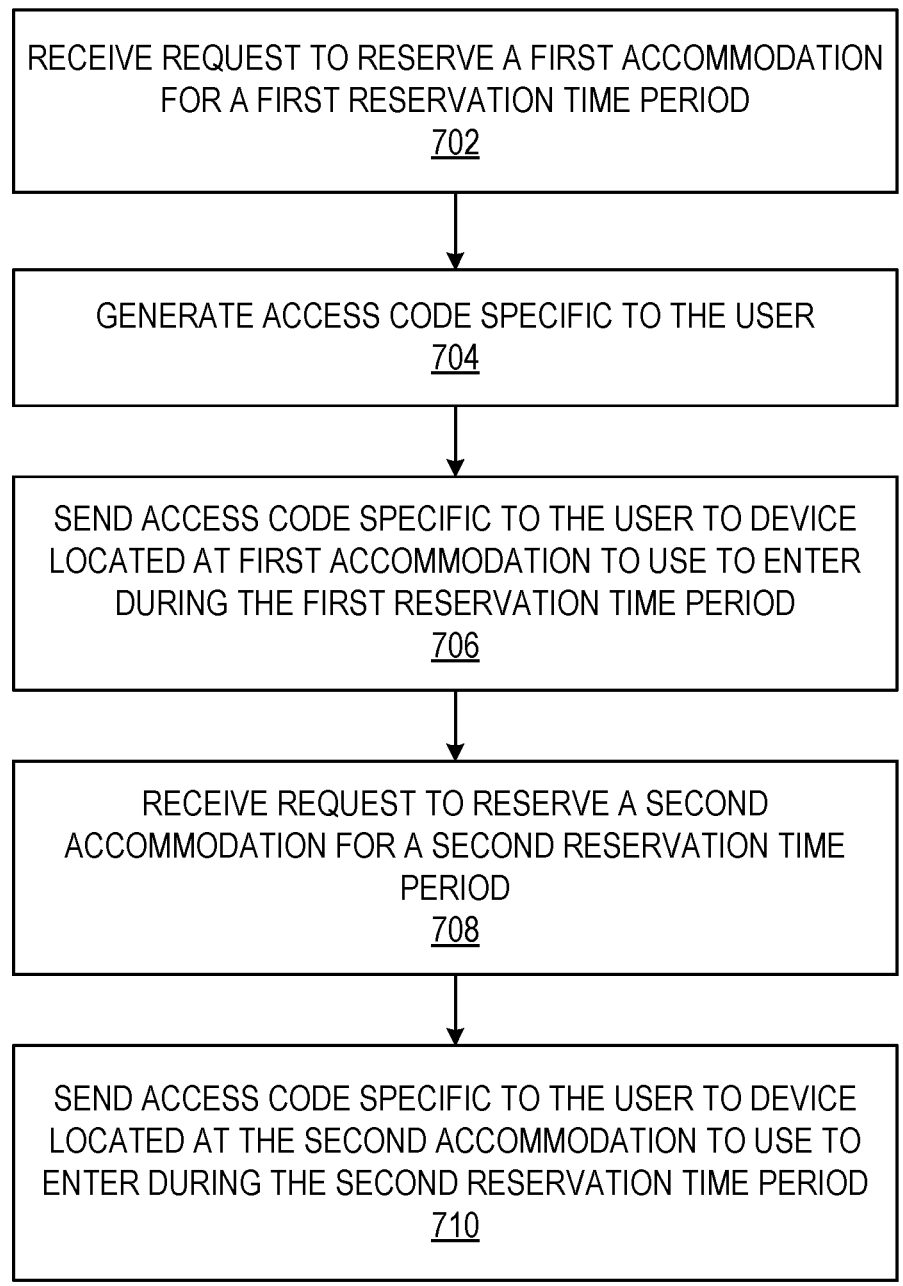
FIG. 7 is a flow chart illustrating aspects of a method, according to some embodiments.

FIG. 7 is a flow chart illustrating aspects of a method 700 for generating an access code specific to a user and utilizing that access code in a smart home short-term rental system, according to some example embodiments. For illustrative purposes, the method 700 is described with respect to the networked system 100 of FIG. 1. It is to be understood that the method 700 may be practiced with other system configurations in other embodiments.

Figure 8:
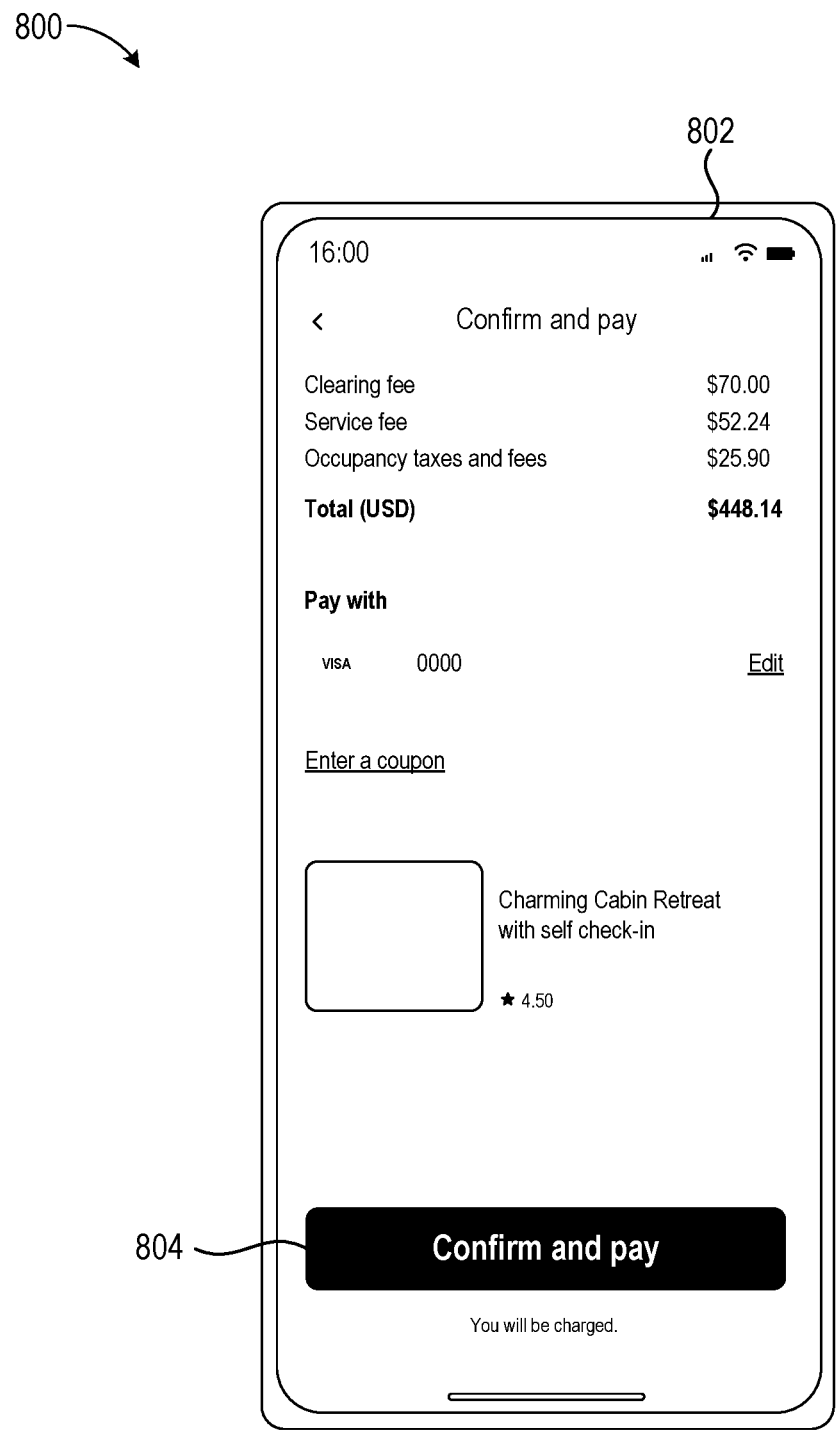
FIGS. 8-9 each illustrate an example user interface, according to some embodiments.

In operation 702, a computing system (e.g., server system 102, reservation system 124, or smart home short-term rental system 128) receives a request to reserve a first accommodation for a first reservation time period. For example, a guest may use a computing device (e.g., client device 110) to access one or more listings for accommodations in Petaluma. The user selects a listing to book and provides reservation details, including a check in and check out date for the reservation. FIG. 8 illustrates an example user interface 800 on a computing device 802 that allows a user to select an option 804 to "Confirm and pay" to book the reservation. Once the user selects the option 804 to book the reservation, the computing device sends the request to the computing system to reserve the accommodation for the reservation time period from the check in date to the check out date.

In operation 704, the computing system generates an access code specific to the user to use to enter an accommodation in the online marketplace during a reservation time period. Namely, this access code can be used by the user to access any given accommodation in the online marketplace that utilizes devices with access codes, during a period that the user has reserved the given accommodation. In this way the user only needs to use and remember one access code, regardless of which property the user is accessing. The access code is generated using a random number generator, based on an identifier associated with the user (e.g., a user's zip code, the last four numbers of the user's phone number), or other means. If the user has not yet provided (or wishes to change or update) user preferences for temperature, entertainment streaming, and so forth, they user can also provide user preferences that are received and stored by the computing system of the online marketplace. For example, the computing system can store the user preferences in a profile for the user.

Figure 9:
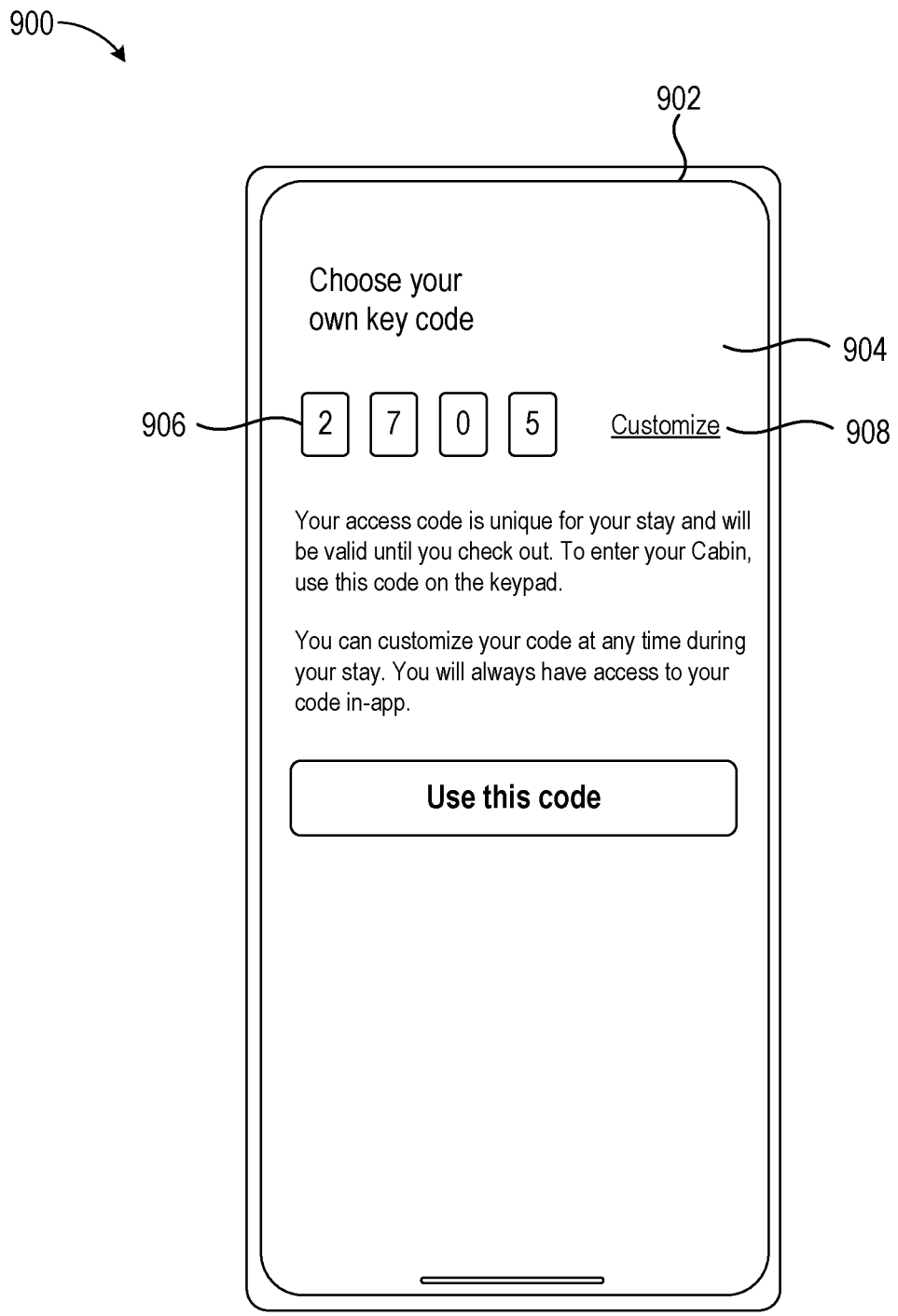

The computing system generates a confirmation of a reservation for the accommodation for the first reservation time period and the access code specific to the user to use to enter the first accommodation during the first reservation time period. The computing system sends the confirmation that includes the access code specific to the user to a computing device of the user. FIG. 9 illustrates an example user interface 900 of a computing device 902 that displays a message 904 comprising the user specific access code 906. In one example, the user can customize the access code, such as by selecting an option 908 to customize or personalize the access code. If the user chooses to personalize the access code, the user can enter a new access code that will be used as the user specific access code for accommodations in the online marketplace. The computing devices sends the custom access code to the computing system, the computing system receives the access code from the computing device and sets the custom access code as the access code for the specific user. For example, the computing system can store the access code in a profile for the user.

Returning to FIG. 7, in operation 706 the computing system sends the access code specific to the user to a computing device (e.g., accommodation device 140) located at the booked accommodation (e.g., the house in Petaluma) at a predetermined time before a start of the first reservation time period to allow access to the first accommodation during the first reservation time period. In one example, the computing system sends the access code to a smart hub that controls entry access devices in the accommodation. In another example, the computing system sends the access code to an entry access device (e.g., smart lock) in the accommodation. In yet another example, the computing systems sends the access code to more than one device in the accommodation. In another example, the access code is sent to the one or more devices in the accommodation via a third-party server (e.g., third-party cloud). The access code is automatically removed from the computing device(s) in the accommodation at the end of the reservation time period by the computing devices themselves or by instruction from a smart hub or the computing system at the end of the reservation time period.

Figure 14:
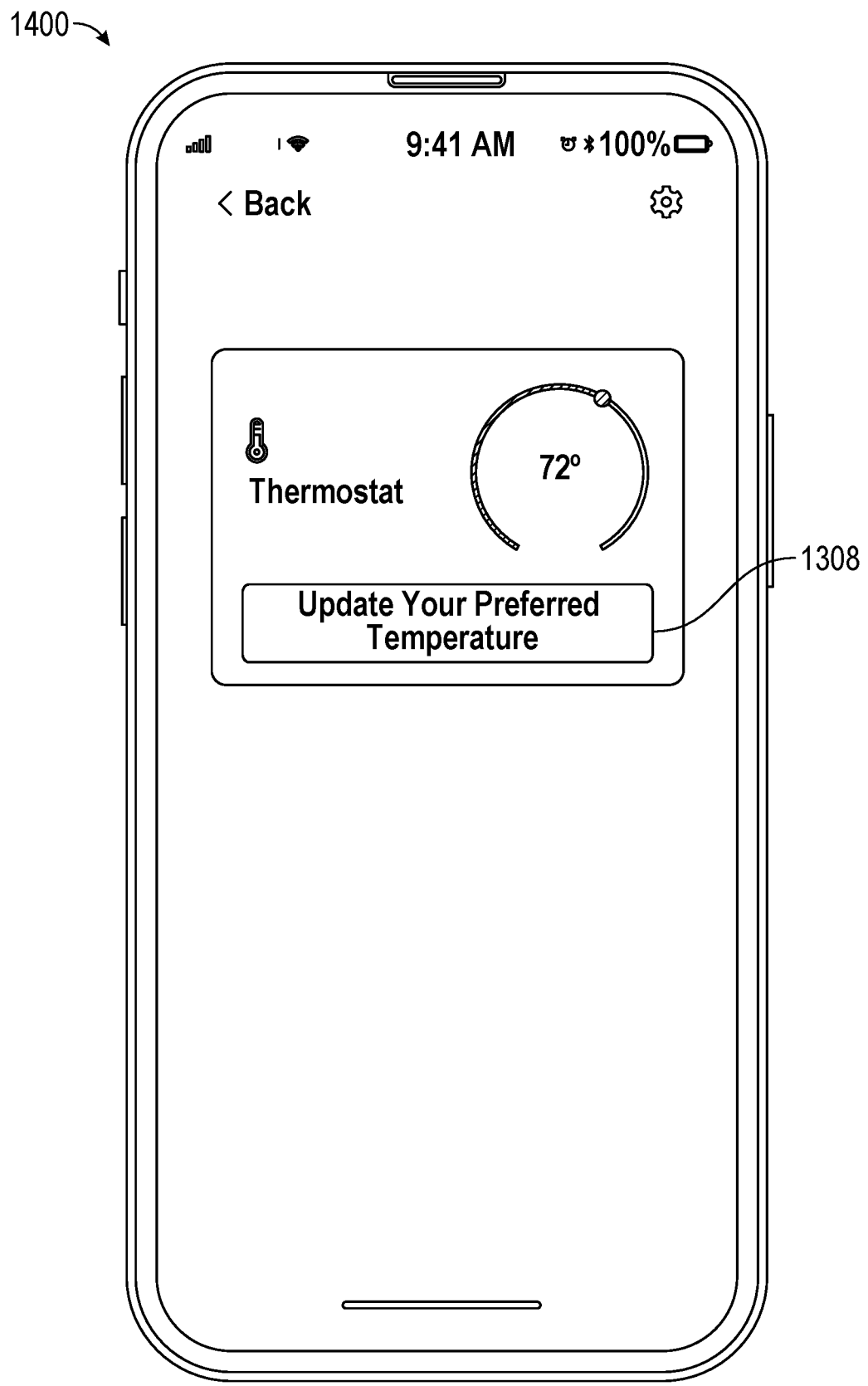

In one example, the computing system also generates user environmental preferences for the accommodation. For example, a user may have saved preferences in a user profile stored in one or more databases of the computing systems that includes one or more of temperatures settings, lighting settings, entertainment settings, and so forth. These can include access to accounts such as a google assistant account, a Netflix account, and the like. For example, a user may prefer a temperature setting of 70 degrees, an outside light to be lit on arrival and have a Netflix account. FIG. 14 illustrates an example user interface 1400 that can be provided to a user to set or update a preference for an accommodation device 140. In this example, a user has already set preferences for a thermostat and thus, an option 1402 is provided for the user to update the preferred temperature for a thermostat in any accommodation.

The computing system would send the user preferences to the computing device at the accommodation (e.g., the accommodation device 140 such as a smart hub) before a start of the reservation time period to be activated for arrival of the guest (e.g., for a start time of the reservation time period). In one example, the computing system would only send those setting that are relevant to the accommodation. For example, if the accommodation does not have a television, the computing system would not send the entertainment settings including the Netflix account information. Further, the user preferences would be removed at the end of the reservation time period.

In one example, the computing system sends temperature settings for the user to the computing device located at the accommodation to cause instructions to a thermostat located in the accommodation to be set to a temperature setting according to the temperature preferences for the user, during the reservation time period. For example, a user may prefer to have any heating and cooling system turned off at night and a daily temperature to be set to 70 degrees.

In another example, the computing system sends entertainment settings preferences to the computing device located in the accommodation so that, during the reservation time period, an entertainment device (e.g., TV) located in the accommodation is set up with the entertainment preferences for the user. For example, a device controlling a TV (e.g., Roku, Chromecast) or a smart TV can be set up with a user's Netflix account information so that the user can watch movies via the user's own Netflix account.

In operation 708, the computing system receives a request from a computing device associated with the same user to reserve a second accommodation for a second reservation time period. For example, the guest may use the computing device to access one or more listings for accommodations in Borrego Springs. The user selects a listing to book and provides reservation details, including a check in and check out date for the reservation and described above with respect to operation 702 and show in FIG. 8.

The computing system generates a confirmation of a reservation for the accommodation for the first reservation time period and sends the confirmation that includes the access code specific to the computing device of the user to use to enter the second accommodation during the second reservation time period, as explained above and shown in FIG. 9.

In operation 710, the computing system sends the access code specific to the user to a computing device (e.g., accommodation device 140) located at the booked accommodation (e.g., a home in Borrego Springs) at a predetermined time before a start of the reservation time period to allow access to the accommodation during the reservation time period. In one example the computing system sends the access code to a smart hub that controls entry access devices in the accommodation. In another example, the computing system sends the access code to an entry access device (e.g., smart lock) in the accommodation. In another example, the computing system sends the access code to more than one device in the accommodation. In another example, the access code is sent to the one or more devices in the accommodation via a third-party server (e.g., third-party cloud). The access code is automatically removed from the computing device(s) in the accommodation at the end of the reservation time period by the computing devices themselves or by instruction from a smart hub or the computing system at the end of the reservation time period.

The computing system can also generate and send user environmental preferences for the accommodation, as explained above.

One guest is used in the example described here. It is to be understood that there may be more than one guest for a reservation of an accommodation and that each guest can have a different access code that is specific to each guest. Each access code for each guest can be used to access accommodation device(s) 140 in the accommodation during the reservation time period for the guests. In one example, a same access code can be used for all guests for the reservation. Each access code, or the same access code, is sent by the smart home short-term rental system 128 to each computing device of each guest.

Users other than guests may also have an access code to enter the accommodation. For example, one or more hosts or owners, housekeeping, customer support agents, and so forth, may have an access code to enter the accommodation. These access codes can also be stored in a user profile of the owner or host of the accommodation. In this way, others can be granted access without having access to an actual account for one or more entry access devices.

In some locations (e.g., city, county, state, country) there may be local laws and regulations that limit who can enter an accommodation during a reservation time period. For example, a guest may reserve a flat in Italy from June 8 through June 17. The computing system can determine that the flat is in a location associated with restrictions for access to an accommodation during a reservation time period of the accommodation. The computing system can then disable the access codes that are specific to the users that are not the guests, during the reservation time period and then enable the access codes that are specific the users that are not guests, at the end of the reservation period. For example, starting at check in time on June 8, only the guest (or guests) that have reserved the flat would be allowed to use their access codes to enter the flat. No housekeeping or host access code would work during the reservation time period as their access codes would be disabled. After checkout time on June 17, the housekeeping and host access codes would again be activated so that housekeeping and the host could access the flat to clean it and prepare it for the next guest.

Once the access code is received by the computing device of the user, the user can use the access code to request entry of the accommodation during the reservation time period. For example, when the user arrives at the accommodation, the user can use the computing device to interact (e.g., via an application associated with the smart home short-term rental system 128) with the entry access device (e.g., accommodation device 140), such as a smart lock on a gate, garage, or door to the accommodation. For example, an application associated with the smart home short-term rental system 128 can be used on the computing device so that a user does not need to download any separate applications for each accommodation device 140.

In one example, the computing device issues a command (e.g., via the application associated with the smart home short-term rental system 128) that is sent to a computing system, such as the smart home short-term rental system 128 (e.g., smart home short-term rental cloud), to control the entry access device. The computing system checks an identifier or other information associated with the command and the computing device to determine if the computing device is authorized to perform the command, including if the command is within the reservation time period during which access is allowed. If so, the computing system instructs the entry access device to perform the command (e.g., lock or unlock) either directly or via a third-party server 130 (e.g., a third-party cloud associated with the entry access device), and the entry access device locks or unlocks the gate, garage, door, or other entry to the accommodation, according to the command.

In another example, the computing device issues a command that is sent to a smart hub (e.g., accommodation device 140) in the accommodation to instruct the entry access device to perform a command (e.g., lock or unlock). The smart hub checks an identifier or other information associated with the command and the computing device to determine if the computing device is authorized to perform the command, including if the command is within the reservation time period during which access is allowed. If so, the smart hub instructs the entry access device to perform the command (e.g., lock or unlock) either directly or via a third-party server 130 (e.g., a third-party cloud associated with the entry access device), and the entry access device locks or unlocks the gate, garage, door, or other entry to the accommodation, according to the command.

In another example the user can input the access code into a keypad or other interface on the entry access device. In one example, instructions are generated on the fly for how to use a particular entry access device and provided to the user. A user can be easily confused since each manufacturer of an entry access device, and even different models of entry access devices for a single manufacturer, can require a different way to interact with the entry access device. For instance, a first manufacturer may require a user select a predefined button, then enter an access code, and then enter another predefined button and another manufacturer may require a user to enter an access code and then select a predefined button.

To generate the instructions on the fly, the computing system or computing device detects the type of entry access device by determining the manufacturer, product model number, or other identifier for the entry access device. The computing system or device maps the type of entry access device (e.g., manufacturer, product model number, other identifier) to a series of images files corresponding to the type of entry access device. The series of image files can be stored in one or more database(s) 126 or other storage location. Using the series of image files and the entry access code for the guest, the computing system or device generates a composite animation of an input sequence for using the entry access device. The composite animation of the input sequence for using the entry access device is displayed to the user on the computing device.

Figure 15A:
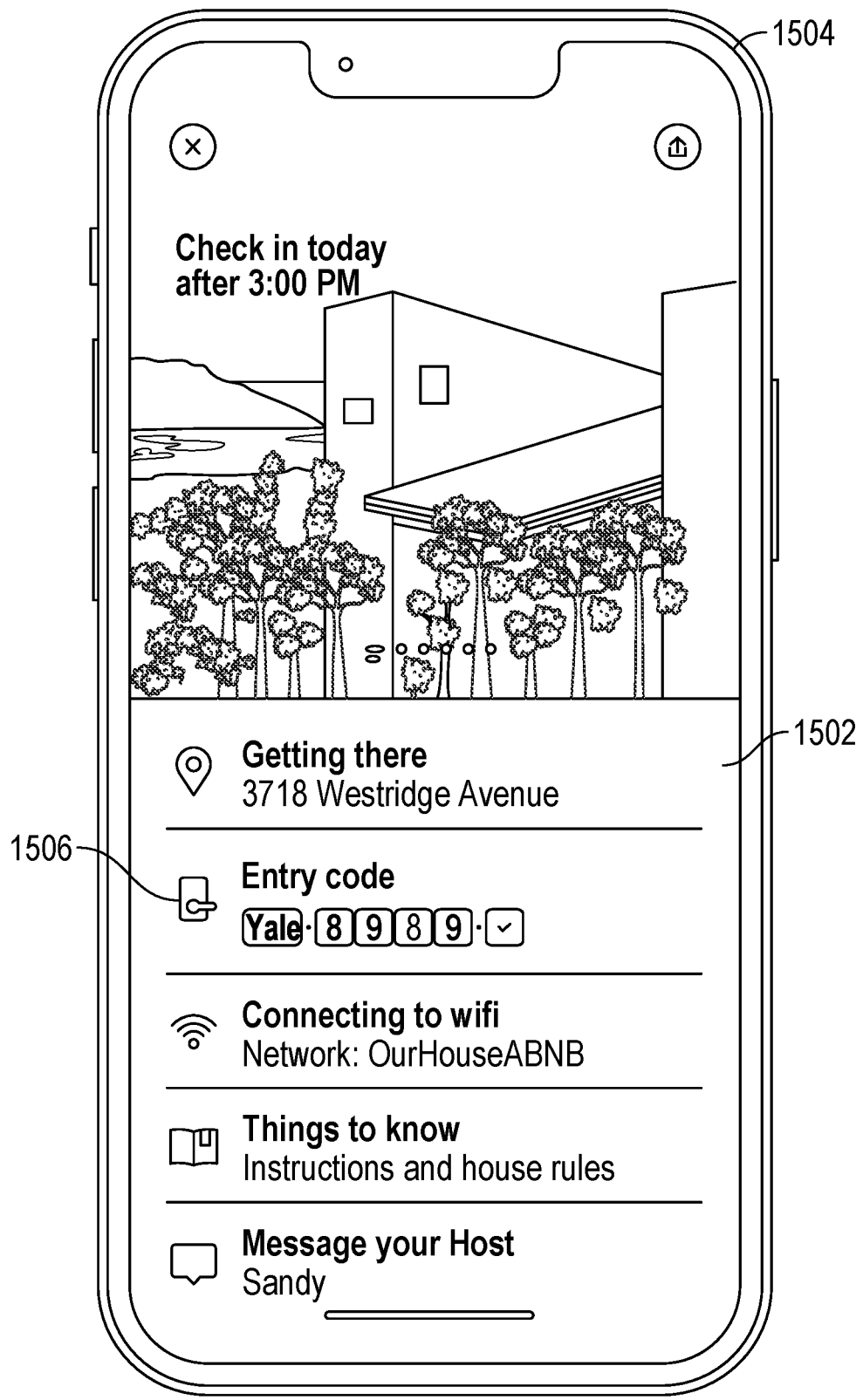
FIGS. 15A-15C each illustrate an example user interface, according to some example embodiments.

FIG. 15A illustrates an example user interface 1502 displayed on a computing device 1504. In the example user interface 1502, an entry access code item 1506 is displayed. This entry access code item 1502 is specific to the entry access device type for the accommodation and shows the sequence of input needed to use the entry access device. In this example, a user would select "Yale", then select the digits corresponding to the access code (e.g., 8989) and then select a check mark to complete the input. In this example, the computing system or device detects the type of entry access device (e.g., Yale) and dynamically displays the entry access code item 1506 that corresponds to the type of entry access device using the entry access code for the user.

Figure 15B:
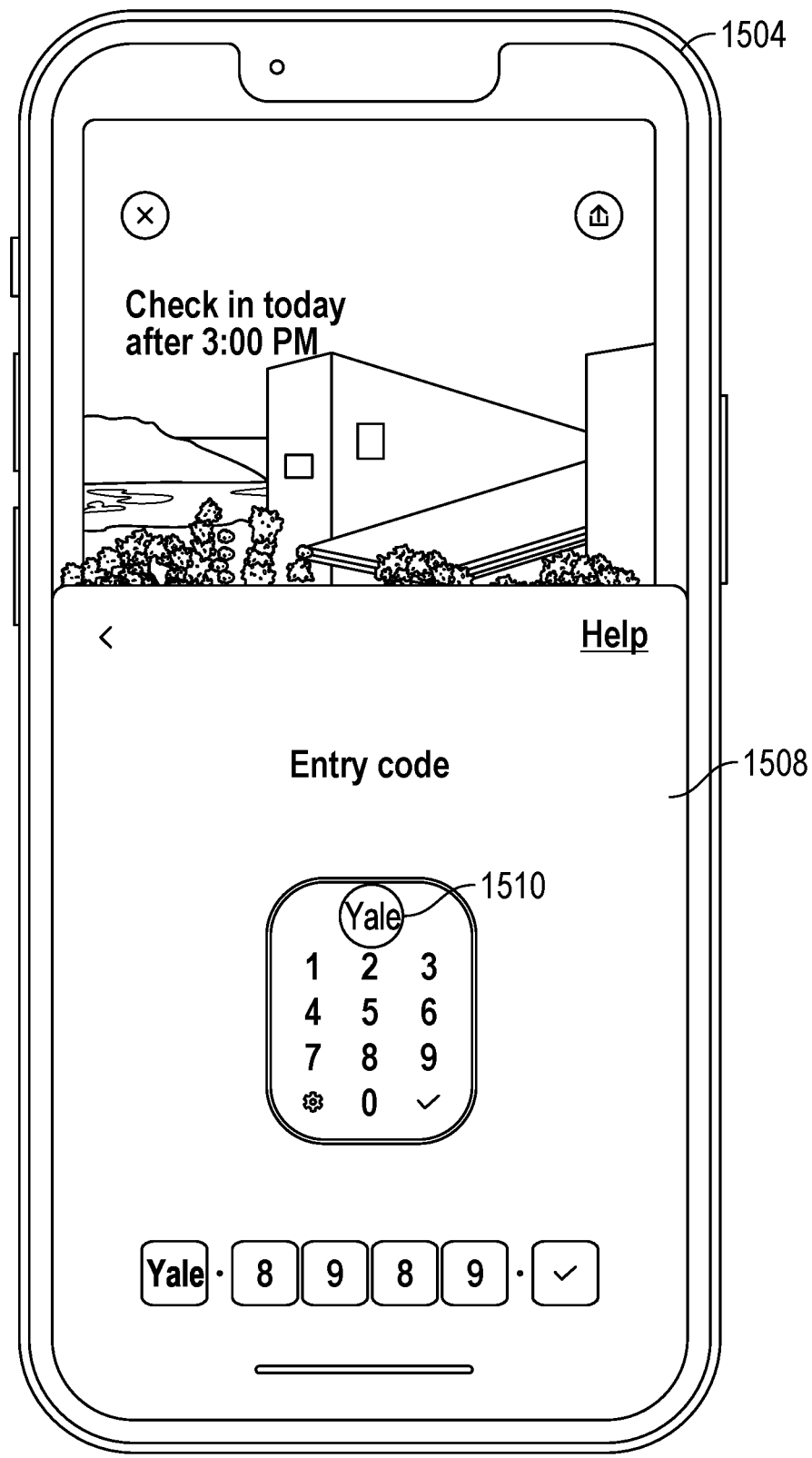
Figure 15C:
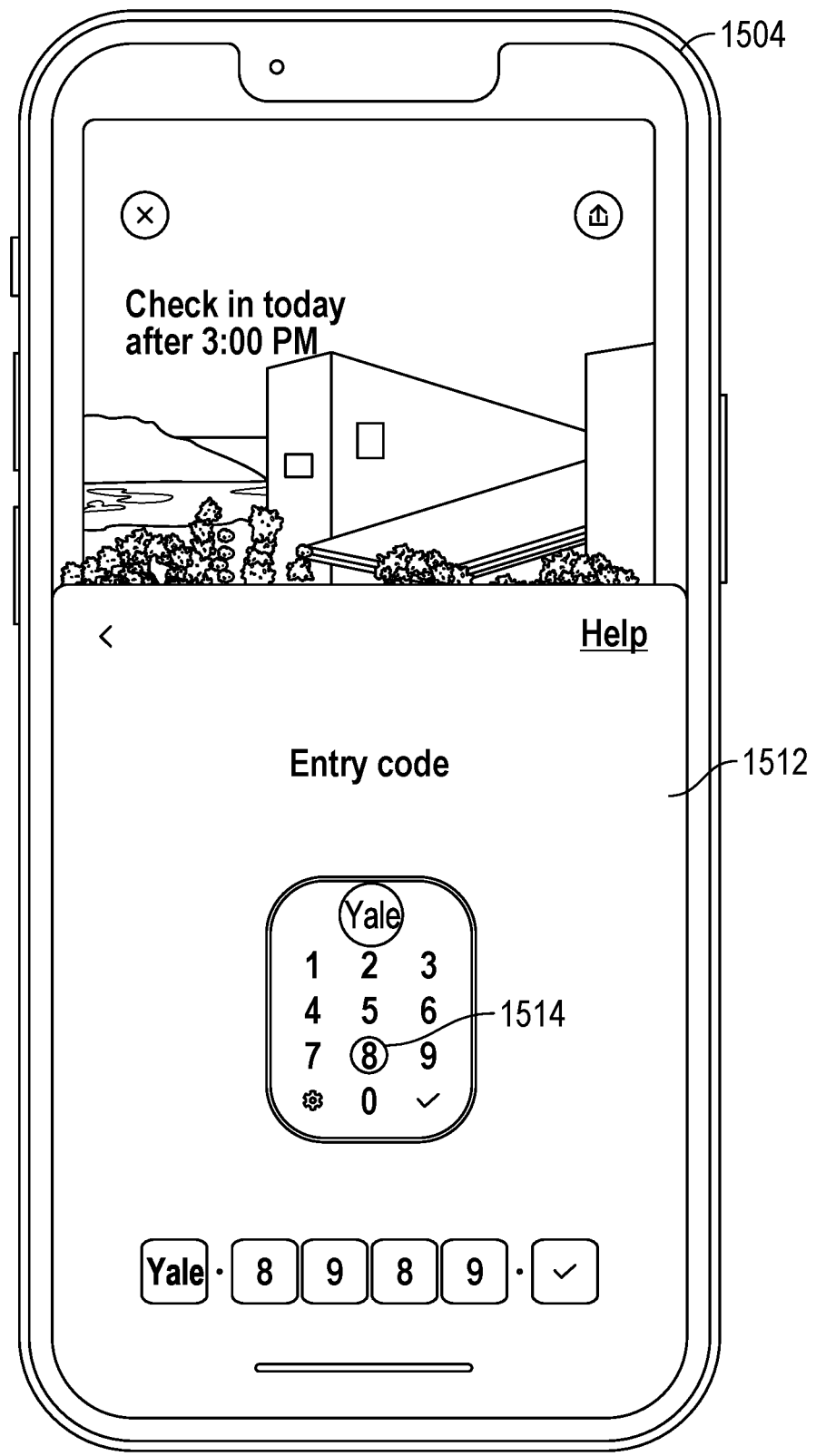

FIG. 15B shows an example user interface 1508 displayed on the computing device 1504. The example user interface 1508 shows a screen shot during a (composite) animation that is generated on the fly, as explained above, specific to the entry access device type. The example user interface 1508 shows a selection of "Yale" and then in FIG. 15C the example user interface 1512 shows a screen shot (e.g., a future frame in the animation) showing a selection of the first digit "8" 1514 of the entry access code. The animation would continue in this way with showing a selection of the second digit "9" the third digit "8" the fourth digit "9" and the checkmark.

In some examples, the user can use the access code specific to the user for each reservation. For example, the user can use the same access code for the house in Petaluma, for the home in Borrego Springs, and for the flat in Italy regardless of whether the entry access devices are from a same manufacturer.

In one example, the smart home short-term rental system 128 receives a device status from one or more accommodation devices 140. For example, the smart home short-term rental system 128 can detect entry of the access code specific to the user at an entry access device (e.g., accommodation device 140) and send a notification to a computing device of a host or owner and/or other user indicating that the guest has entered or exited an accommodation, whether a gate, garage, door or other access point is open, close, locked, unlocked, or other status. The smart home short-term rental system can also determine status of an entertainment device, thermostat, lighting, or other accommodation devices 140 within the accommodation and also provide notification on status of these devices.

There may be a scenario where an accommodation does not have internet service or the internet service is not working or available. In this case, the computing system (e.g., server system 102, smart home short-term rental system 128) can determine there is no network connection at the accommodation over which to send the access code specific to the user to an accommodation device 140 (e.g., entry access device such as a smart lock) or user preferences. In this case the computing system sends the access code specific to the user (and/or user preferences) to a computing device of the user. For example, the computing system sends the access code to a mobile device or wearable device (e.g., smart watch) of the user. The computing device of the user can detect proximity to the entry access device (e.g., determine that the computing device is located near or within a predetermine distance of the entry access device) and transmit the access code to the entry access device or a smart hub in the accommodation to allow entry of the user upon input of the access code. The access code can be transmitted to the entry access device via short-range wireless communication, such as via Bluetooth, WiFi, NFC, ultraband, Zigbee or other short-range wireless communication mode.

In one example, a customer support agent for the online marketplace may be able to control access to one or more accommodation devices. For example, the smart home short-term rental system 128 can detect that a user is having trouble entering an accommodation or a user can contact a customer support agent when they are having trouble accessing the accommodation. The customer support agent can confirm the user is authorized to access the accommodation and then control the accommodation device(s) on behalf of the user. For example, the customer support agent can send, via a client device 110, a request to unlock, lock or other commands, to an accommodation device 140 of the accommodation direct, via a smart hub, or via the smart home short-term rental system 128 or third-party server 130. In this way a customer support agent can allow the user to access the accommodation remotely and in real time. In another example, a host can be notified that a user is having trouble entering the accommodation.

In one example, the smart home short-term rental system 128 detects a message from a guest asking for an access code. For example, the smart home short-term rental system 128 detects a message from a guest to a host and parses the message to using a natural language processing technique to determine that the message is asking for the access code. The smart home short-term rental system 128 retrieves the access code associated with the user and reservation and generates a message with the access code. The smart home short-term rental system 128 sends the access code to the computing device of the user. The smart home short-term rental system 128 can further provide instructions and/or an animation specific to the type of entry access device, as described above.

In another example, the smart home short-term rental system 128 detects a message from a guest asking to change a check in or checkout time. For example, the smart home short-term rental system 128 detects a message from a guest to a host and parses the message to using a natural language processing technique to determine that the message to change the check in or checkout time (or both). The smart home short-term rental system 128 generates a message with the requested time change and sends it to the host for approval. If the smart home short-term rental system 128 receives approval from the host, the smart home short-term rental system 128 automatically adjusts the check in or checkout time (or both) that was approved and modifies the period when the guest access code is active to the new check in and/or checkout time and using any associated grace period.

In view of the disclosure above, various examples are set forth below. It should be noted that one or more features of an example, taken in isolation or in combination, should be considered within the disclosure of this application.

Example 1. A method, comprising:
  receiving, by a computing system from a first computing device associated with a user, a request to reserve a first accommodation for a first reservation time period;
  generating, by the computing system, an access code specific to the user to use to enter an accommodation during a reservation time period;
  sending, by the computing system to the first computing device, a confirmation of a reservation for the accommodation for the first reservation time period and the access code specific to the user to use to enter the first accommodation during the first reservation time period;
  sending, by the computing system, the access code specific to the user to a second computing device located at the first accommodation at a predetermined time before a start of the first reservation time period to allow access to the first accommodation during the first reservation time period, wherein the access code is automatically removed from the second computing device at the first accommodation at the end of the first reservation time period;
  receiving, by the computing system from the first computing device associated with the user, a request to reserve a second accommodation for a second reservation time period;
  sending, by the computing system to the first computing device, a confirmation of the reservation for the second accommodation for the second reservation time period and the access code specific to the user to use to enter the second accommodation during the second reservation time period; and
  sending, by the computing system, the access code specific to the user to a third computing device located at the second accommodation at a predetermined time before a start time of the second reservation time period to allow access to the second accommodation during the second reservation time period, wherein the access code is automatically removed from the second computing device at the second accommodation at the end of the second reservation time period.

Example 2. A method according to any of the previous examples, wherein after generating the access code specific to the user, the method comprises:
  receiving a custom access code from the first computing device; and
  setting the custom access code as the access code specific to the user.

Example 3. A method according to any of the previous examples, further comprising:
  sending temperature settings preferences for the user to the second computing device, wherein during the first reservation time period, a thermostat located in the accommodation is set to a temperature according to the temperature setting preferences for the user.

Example 4. A method according to any of the previous examples, further comprising:
  sending entertainment settings preferences for the user to the second computing device, wherein during the first reservation time period, an entertainment device located in the accommodation is set up with the entertainment preferences for the user.

Example 5. A method according to any of the previous examples, wherein the user is a first user and a second user has an access code specific to the second user for the first accommodation, the method further comprising:
  determining that the first accommodation is in a location associated with restrictions for access to an accommodation during a reservation time period of the accommodation;
  disabling the access code specific to the second user during the reservation time period of the first accommodation; and
  enabling the access code specific to the second user at the end of the reservation period.

Example 6. A method according to any of the previous examples, wherein the second computing device located at the first accommodation and the third computing device located at the second accommodation each comprise a door access device or a smart hub device.

Example 7. A method according to any of the previous examples, wherein the access code specific to the user is sent to the second computing device located at the first accommodation via a third-party server associated with the second computing device and wherein the third-party server sends the access code specific to the first user to the second computing device located at the first accommodation.

Example 8. A method according to any of the previous examples, further comprising:
   detecting entry of the access code specific to the user at the second computing device of the first accommodation; and
   sending a notification to a fourth computing device for a host of the first accommodation indicating that the user has entered or exited the accommodation.

Example 9. A method according to any of the previous examples, wherein the second computing device is a door access device or a smart hub device, and further comprising:
   determining that there is no network connection at the first accommodation over which to send the access code specific to the user to the second computing device;
   sending the access code specific to the user to the first computing device associated with the user;
   detecting that the first computing device is located near the accommodation; and
   transmitting, via short-range wireless communication, the access code specific to the user to second computing device to allow entry of the user upon input of the access code specific to the user.

Example 10. A method according to any of the previous examples, wherein the short-range wireless communication comprises Bluetooth, WiFi, near field communication (NFC), ultraband, or Zigbee.

Example 11. A computing device comprising:
   a memory that stores instructions; and
   one or more processors configured by the instructions to perform operations comprising:
   receiving, from a first computing device associated with a user, a request to reserve a first accommodation for a first reservation time period;
   generating an access code specific to the user to use to enter an accommodation during a reservation time period;
   sending, to the first computing device, a confirmation of a reservation for the accommodation for the first reservation time period and the access code specific to the user to use to enter the first accommodation during the first reservation time period;
   sending the access code specific to the user to a second computing device located at the first accommodation at a predetermined time before a start of the first reservation time period to allow access to the first accommodation during the first reservation time period, wherein the access code is automatically removed from the second computing device at the first accommodation at the end of the first reservation time period;
   receiving, from the first computing device associated with the user, a request to reserve a second accommodation for a second reservation time period;
   sending, to the first computing device, a confirmation of the reservation for the second accommodation for the second reservation time period and the access code specific to the user to use to enter the second accommodation during the second reservation time period; and
   sending the access code specific to the user to a third computing device located at the second accommodation at a predetermined time before a start time of the second reservation time period to allow access to the second accommodation during the second reservation time period, wherein the access code is automatically removed from the second computing device at the second accommodation at the end of the second reservation time period.

Example 12. A computing device according to any of the previous examples, wherein after generating the access code specific to the user, the operations comprise:
   receiving a custom access code from the first computing device; and
   setting the custom access code as the access code specific to the user.

Example 13. A computing device according to any of the previous examples, the operations further comprising:
   sending temperature settings preferences for the user to the second computing device, wherein during the first reservation time period, a thermostat located in the accommodation is set to a temperature according to the temperature setting preferences for the user.

Example 14. A computing device according to any of the previous examples, the operations further comprising:
   sending entertainment settings preferences for the user to the second computing device, wherein during the first reservation time period, an entertainment device located in the accommodation is set up with the entertainment preferences for the user.

Example 15. A computing device according to any of the previous examples, wherein the user is a first user and a second user has an access code specific to the second user for the first accommodation, the operations further comprising:
   determining that the first accommodation is in a location associated with restrictions for access to an accommodation during a reservation time period of the accommodation;
   disabling the access code specific to the second user during the reservation time period of the first accommodation; and
   enabling the access code specific to the second user at the end of the reservation period.

Example 16. A computing device according to any of the previous examples, wherein the second computing device located at the first accommodation and the third computing device located at the second accommodation each comprise a door access device or a smart hub device.

Example 17. A computing device according to any of the previous examples, wherein the access code specific to the user is sent to the second computing device located at the first accommodation via a third-party server associated with the second computing device and wherein the third-party server sends the access code specific to the first user to the second computing device located at the first accommodation.

Example 18. A computing device according to any of the previous examples, the operations further comprising:
   detecting entry of the access code specific to the user at the second computing device of the first accommodation; and
   sending a notification to a fourth computing device for a host of the first accommodation indicating that the user has entered or exited the accommodation.

Example 19. A computing device according to any of the previous examples, wherein the second computing device is a door access device or a smart hub device, and further comprising:

determining that there is no network connection at the first accommodation over which to send the access code specific to the user to the second computing device;

sending the access code specific to the user to the first computing device associated with the user;

detecting that the first computing device is located near the accommodation; and transmitting, via short-range wireless communication, the access code specific to the user to the second computing device to allow entry of the user upon input of the access code specific to the user, wherein the short-range wireless communication comprises Bluetooth, WiFi, near field communication (NFC), ultraband, or Zigbee.

Example 20. A nontransitory computer-readable medium comprising instructions stored thereon that are executable by at least one processor to cause a computing device to perform operations comprising:

receiving, from a first computing device associated with a user, a request to reserve a first accommodation for a first reservation time period;

generating an access code specific to the user to use to enter an accommodation during a reservation time period;

sending, to the first computing device, a confirmation of a reservation for the accommodation for the first reservation time period and the access code specific to the user to use to enter the first accommodation during the first reservation time period;

sending the access code specific to the user to a second computing device located at the first accommodation at a predetermined time before a start of the first reservation time period to allow access to the first accommodation during the first reservation time period, wherein the access code is automatically removed from the second computing device at the first accommodation at the end of the first reservation time period;

receiving, from the first computing device associated with the user, a request to reserve a second accommodation for a second reservation time period;

sending, to the computing device, a confirmation of the reservation for the second accommodation for the second reservation time period and the access code specific to the user to use to enter the second accommodation during the second reservation time period; and sending the access code specific to the user to a third computing device located at the second accommodation at a predetermined time before a start time of the second reservation time period to allow access to the second accommodation during the second reservation time period, wherein the access code is automatically removed from the second computing device at the second accommodation at the end of the second reservation time period.

Figure 10:
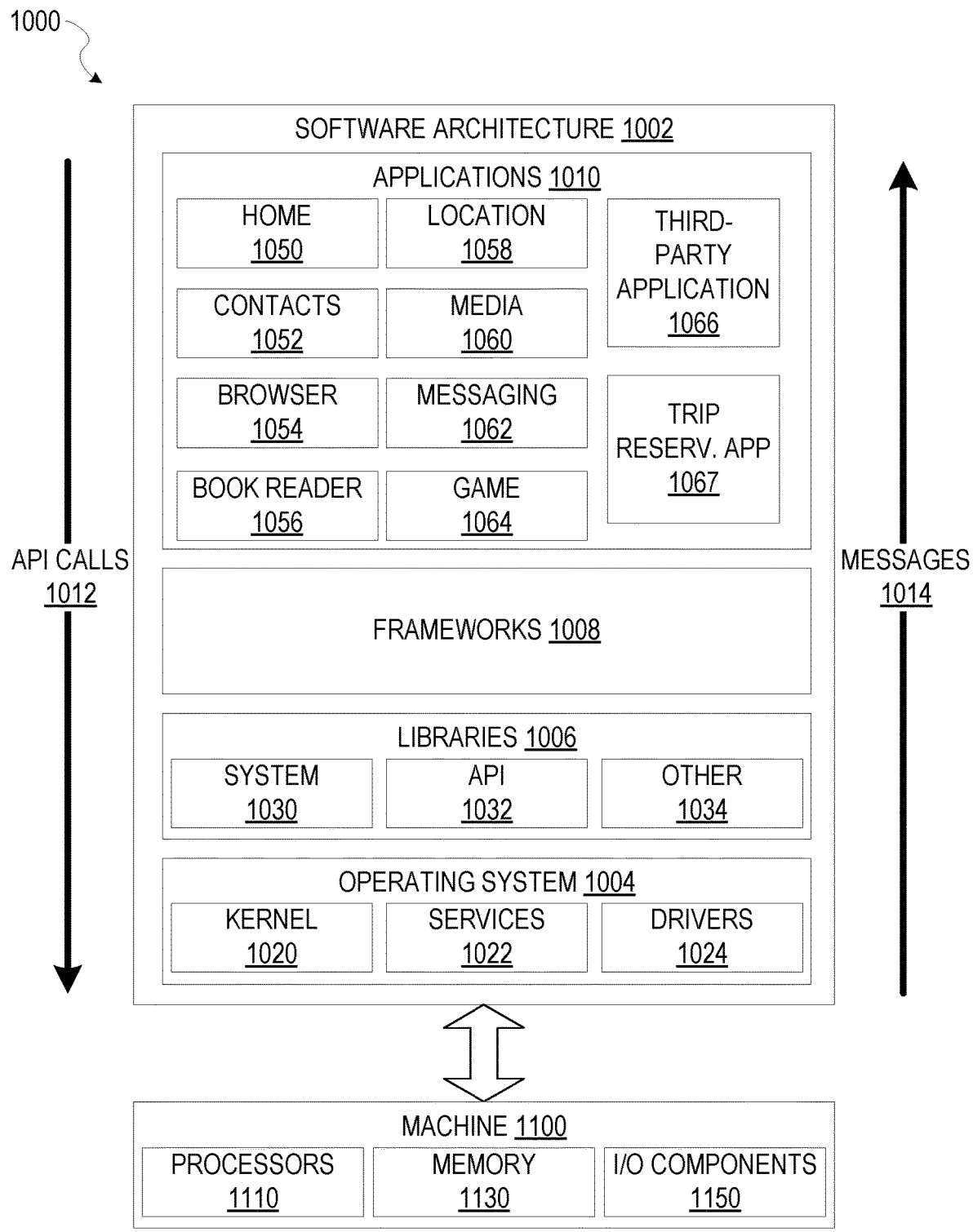
FIG. 10 is a block diagram illustrating an example of a software architecture that may be installed on a machine, according to some embodiments.

FIG. 10 is a block diagram 1000 illustrating a software architecture 1002, which can be installed on any one or more of the devices described above. For example, in various embodiments, the client device 110 and server systems 130, 102, 120, 122, and 124 may be implemented using some or all of the elements of the software architecture 1002. FIG. 10 is merely a nonlimiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionalities. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Some embodiments may particularly include a trip reservation application 1067, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The trip reservation application 1067 may request and display various data related to an online marketplace and may provide the capability for a user 106 to input data related to the system via voice, a touch interface, or a keyboard, or using a camera device of the machine 1100, communication with a server system via the I/O components 1150, and receipt and storage of object data in the memory 1130. Presentation of information and user inputs associated with the information may be managed by the trip reservation application 1067 using different frameworks 1008, library 1006 elements, or operating system 1004 elements operating on a machine 1100.

Figure 11:
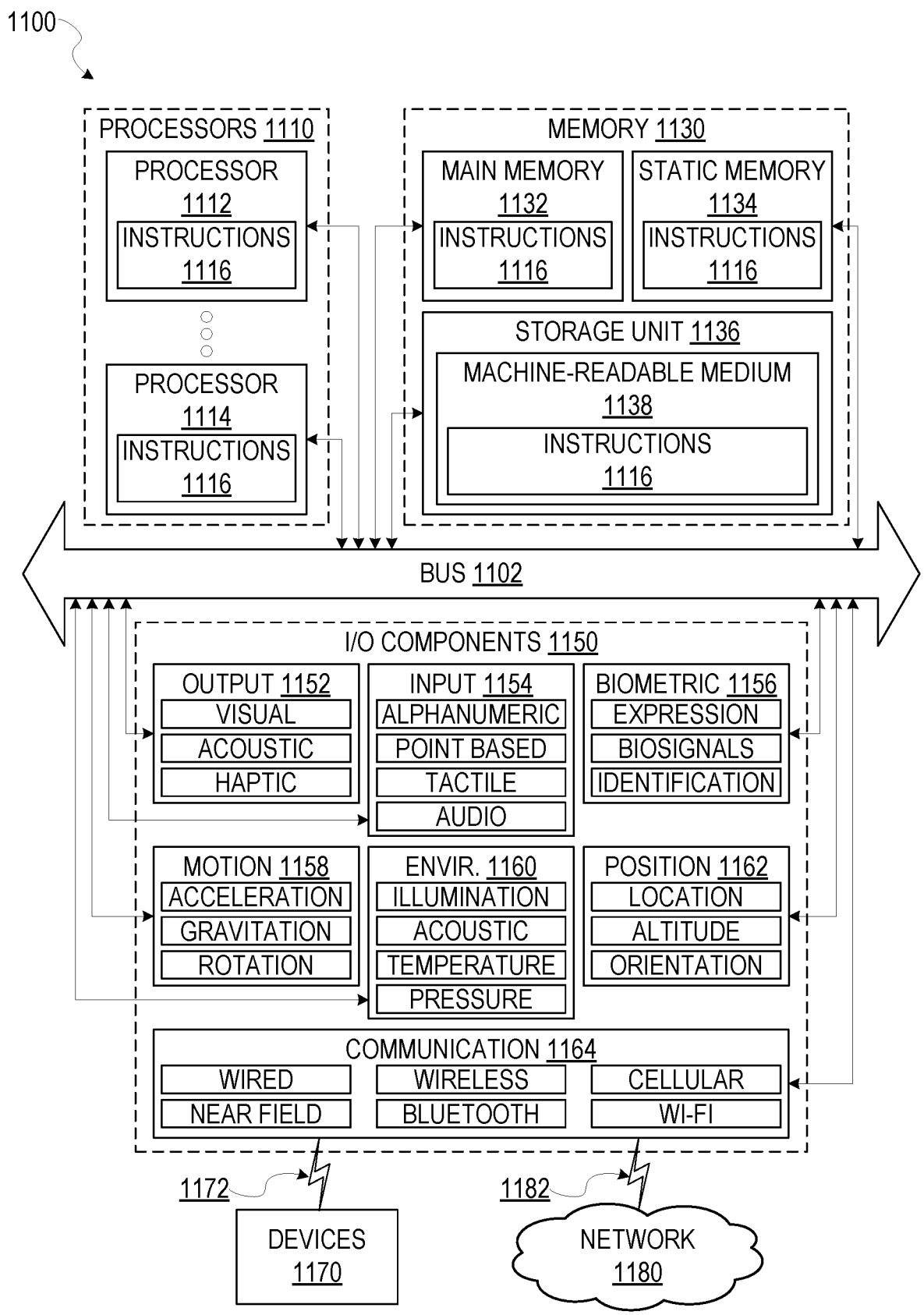
FIG. 11 illustrates a diagrammatic representation of a machine, in the form of a computer system, within which a set of instructions may be executed for causing the machine to perform any one or more of the methodologies discussed herein, according to an embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server system 130, 102, 120, 122, 124, and the like, or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other nonvolatile memory (e.g., erasable programmable read-only memory (EPROM)), or any suitable combination thereof. The term "machine-readable medium" specifically excludes nonstatutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, eye tracking), measure biosignals (e.g., blood pressure, heart rate, body temperature, perspiration, brain waves), identify a person (e.g., voice identification, retinal identification, facial identification, fingerprint identification, electroencephalogram-based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a USB).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect one-dimensional bar codes such as a Universal Product Code (UPC) bar code, multidimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a VPN, a LAN, a WLAN, a WAN, a WWAN, a MAN, the internet, a portion of the internet, a portion of the PSTN, a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile (GSM) communications connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., HTTP). Similarly, in other example embodiments, the instructions 1116 are transmitted or received using a transmission medium via the coupling 1172 (e.g., peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "nontransitory" should not be construed to mean that the medium is incapable of movement; the machine-readable medium 1138 should be considered as being transportable from one physical location to another. Additionally, since the machine-readable medium 1138 is tangible, the machine-readable medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   generating, by a computing system, an access code specific to a user that is to be used to enter accommodations reserved by the user during a respective reservation time period for each of the accommodations reserved by the user;
   sending, by the computing system to a first computing device, a confirmation of a reservation for a first accommodation for a first reservation time period and the access code specific to the user to use to enter the first accommodation during the first reservation time period;
   determining that a second computing device located at the first accommodation is offline and the access code specific to the user cannot be added to the second computing device;
   based on determining that the second computing device is offline and the access code specific to the user cannot be added to the second computing device, determining a backup code stored at the second computing device;
   sending the backup code to the first computing device to use to enter the first accommodation during the first reservation time period;
   sending, by the computing system to the first computing device, a confirmation of a reservation for a second accommodation for a second reservation time period and the access code specific to the user to use to enter the second accommodation during the second reservation time period;
   sending, by the computing system, the access code specific to the user to a third computing device located at the second accommodation at a predetermined time before a start time of the second reservation time period to allow access to the second accommodation during the second reservation time period; and
   automatically removing the access code from the third computing device at the second accommodation at the end of the second reservation time period.

2. The method of claim 1, wherein after generating the access code specific to the user, the method comprises:
   receiving a custom access code from the first computing device; and
   setting the custom access code as the access code specific to the user.

3. The method of claim 1, further comprising:
   sending temperature settings preferences for the user to the second computing device, wherein during the first reservation time period, a thermostat located in the first accommodation is set to a temperature according to the temperature settings preferences for the user.

4. The method of claim 1, further comprising:
   sending entertainment settings preferences for the user to the second computing device, wherein during the first reservation time period, an entertainment device located in the first accommodation is set up with the entertainment settings preferences for the user.

5. The method of claim 1, wherein the user is a first user and a second user has an access code specific to the second user for the first accommodation, the method further comprising:
   determining that the first accommodation is in a location associated with restrictions for access to an accommodation during the first reservation time period of the first accommodation;

disabling the access code specific to the second user during the first reservation time period of the first accommodation; and enabling the access code specific to the second user at the end of the first reservation time period.

6. The method of claim 1, wherein the second computing device located at the first accommodation and the third computing device located at the second accommodation each comprise a door access device or a smart hub device.

7. The method of claim 1, wherein the access code specific to the user is sent to the second computing device located at the first accommodation via a third-party server associated with the second computing device and wherein the third-party server sends the access code specific to the user to the second computing device located at the first accommodation.

8. The method of claim 1, further comprising:
detecting entry of the access code specific to the user at the second computing device of the first accommodation; and
sending a notification to a fourth computing device for a host of the first accommodation indicating that the user has entered or exited the first accommodation.

9. The method of claim 1, wherein the second computing device is a door access device or a smart hub device, and further comprising:
determining that there is no network connection at the first accommodation over which to send the access code specific to the user to the second computing device;
based on determining that there is no network connection at the first accommodation over which to send the access code specific to the user to the second computing device, sending the access code specific to the user to the first computing device associated with the user; and
based on detecting that the first computing device is located near the first accommodation, causing transmission, via short-range wireless communication, of the access code specific to the user from the first computing device to the second computing device to allow entry of the user upon input of the access code specific to the user.

10. The method of claim 9, wherein the short-range wireless communication comprises Bluetooth, WiFi, near field communication (NFC), ultraband, or Zigbee.

11. A computing device comprising:
a memory that stores instructions; and
one or more processors configured by the instructions to perform operations comprising:
generating an access code specific to a user that is to be used to enter accommodations reserved by the user during a respective reservation time period for each of the accommodations reserved by the user;
sending, to a first computing device, a confirmation of a reservation for a first accommodation for a first reservation time period and the access code specific to the user to use to enter the first accommodation during the first reservation time period;
determining that a second computing device located at the first accommodation is offline and the access code specific to the user cannot be added to the second computing device;
based on determining that the second computing device is offline and the access code specific to the user cannot be added to the second computing device, determining a backup code stored at the second computing device;

sending the backup code to the first computing device to use to enter the first accommodation during the first reservation time period;

sending, to the first computing device, a confirmation of a reservation for a second accommodation for a second reservation time period and the access code specific to the user to use to enter the second accommodation during the second reservation time period;

sending the access code specific to the user to a third computing device located at the second accommodation at a predetermined time before a start time of the second reservation time period to allow access to the second accommodation during the second reservation time period; and automatically removing the access code from the third computing device at the second accommodation at the end of the second reservation time period.

12. The computing device of claim 11, wherein after generating the access code specific to the user, the operations comprise;
receiving a custom access code from the first computing device; and
setting the custom access code as the access code specific to the user.

13. The computing device of claim 11, the operations further comprising:
sending temperature settings preferences for the user to the second computing device, wherein during the first reservation time period, a thermostat located in the first accommodation is set to a temperature according to the temperature settings preferences for the user.

14. The computing device of claim 11, the operations further comprising:
sending entertainment settings preferences for the user to the second computing device, wherein during the first reservation time period, an entertainment device located in the first accommodation is set up with the entertainment settings preferences for the user.

15. The computing device of claim 11, wherein the user is a first user and a second user has an access code specific to the second user for the first accommodation, the operations further comprising:
determining that the first accommodation is in a location associated with restrictions for access to an accommodation during the first reservation time period of the first accommodation;
disabling the access code specific to the second user during the first reservation time period of the first accommodation; and
enabling the access code specific to the second user at the end of the first reservation time period.

16. The computing device of claim 11, wherein the second computing device located at the first accommodation and the third computing device located at the second accommodation each comprise a door access device or a smart hub device.

17. The computing device of claim 11, wherein the second computing device is a door access device or a smart hub device, and further comprising:
determining that there is no network connection at the first accommodation over which to send the access code specific to the user to the second computing device;
based on determining that there is no network connection at the first accommodation over which to send the access code specific to the user to the second computing device, sending the access code specific to the user to the first computing device associated with the user; and based on detecting that the first computing device is located near the first accommodation, causing transmission, via short-range wireless communication, of the access code specific to the user from the first computing device to the second computing device to allow entry of the user upon input of the access code specific to the user.

18. A nontransitory computer-readable medium comprising instructions stored thereon that are executable by at least one processor to cause a computing device to perform operations comprising:

generating an access code specific to a user that is to be used to enter accommodations reserved by the user during a respective reservation time period for each of the accommodations reserved by the user;

sending, to a first computing device, a confirmation of a reservation for a first accommodation for a first reservation time period and the access code specific to the user to use to enter the first accommodation during the first reservation time period;

determining that a second computing device located at the first accommodation is offline and the access code specific to the user cannot be added to the second computing device;

based on determining that the second computing device is offline and the access code specific to the user cannot be added to the second computing device, determining a backup code stored at the second computing device;

sending the backup code to the first computing device to use to enter the first accommodation during the first reservation time period;

sending, to the first computing device, a confirmation of a reservation for a second accommodation for a second reservation time period and the access code specific to the user to use to enter the second accommodation during the second reservation time period;

sending the access code specific to the user to a third computing device located at the second accommodation at a predetermined time before a start time of the second reservation time period to allow access to the second accommodation during the second reservation time period; and automatically removing the access code from the third second computing device at the second accommodation at the end of the second reservation time period.

19. The method of claim 1, further comprising:

detecting that the second computing device is back online; and based on detecting that the second computing device is back online, adding the first reservation time period as a date range for the backup code.

20. The method of claim 19, further comprising:

automatically deleting the backup code from the second computing device at the end of the first reservation time period.

* * * * *